US010276157B2

(12) United States Patent
Lynch et al.

(10) Patent No.: US 10,276,157 B2
(45) Date of Patent: Apr. 30, 2019

(54) SYSTEMS AND METHODS FOR PROVIDING A VOICE AGENT USER INTERFACE

(71) Applicant: Nuance Communications, Inc., Burlington, MA (US)

(72) Inventors: Timothy Lynch, Reading, MA (US); Sean P. Brown, San Francisco, CA (US); Paweena Attayadmawittaya, San Francisco, CA (US); Tiago Goncalves Cabaco, Union City, CA (US); Victor Shine Chen, Saratoga, CA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/632,344

(22) Filed: Oct. 1, 2012

(65) Prior Publication Data
US 2014/0095173 A1   Apr. 3, 2014

(51) Int. Cl.
G10L 15/22      (2006.01)
G06F 3/16       (2006.01)
G10L 15/04      (2013.01)
G10L 17/22      (2013.01)
G10L 15/08      (2006.01)
G10L 15/19      (2013.01)
G10L 15/26      (2006.01)
G10L 15/18      (2013.01)
G10L 15/00      (2013.01)

(52) U.S. Cl.
CPC .............. G10L 15/22 (2013.01); G06F 3/167 (2013.01); G10L 15/00 (2013.01); G10L 15/04 (2013.01); G10L 15/08 (2013.01); G10L 15/18 (2013.01); G10L 15/19 (2013.01); G10L 15/26 (2013.01); G10L 17/22 (2013.01); G10L 2015/228 (2013.01)

(58) Field of Classification Search
CPC ......... G10L 15/00; G10L 15/04; G10L 15/08; G10L 15/18; G10L 15/1815; G10L 15/183; G10L 15/19; G10L 15/22; G10L 15/26; G10L 15/265; G10L 2015/22; G10L 17/22
USPC ................................ 704/246, 251, 270, 275
See application file for complete search history.

(56) References Cited

U.S. PATENT DOCUMENTS 5,857,179 A    1/1999  Vaithyanathan et al.
5,890,122 A *  3/1999  Van Kleeck ............ G10L 15/26
                                                    704/235
6,075,534 A    6/2000  VanBuskirk et al.
(Continued)

FOREIGN PATENT DOCUMENTS

WO   WO 2009/075912 A1    6/2009

OTHER PUBLICATIONS

International Search Report and Written Opinion for PCT/US2013/057254 dated Dec. 27, 2013.

Primary Examiner — Feng-Tzer Tzeng
(74) Attorney, Agent, or Firm — Wolf, Greenfield & Sacks, P.C.

(57) ABSTRACT

Some embodiments provide techniques performed by at least one voice agent. The techniques include receiving voice input; identifying at least one application program as relating to the received voice input; and displaying at least one selectable visual representation that, when selected, causes focus of the computing device to be directed to the at least one application program identified as relating to the received voice input.

27 Claims, 10 Drawing Sheets

(56) References Cited

U.S. PATENT DOCUMENTS

| | | |
|---|---|---|
| 6,311,159 B1 | 10/2001 | Van Tichelen et al. |
| 6,499,013 B1 * | 12/2002 | Weber .................. G06F 17/27 |
| | | 704/251 |
| 6,745,165 B2 * | 6/2004 | Lewis .................. G10L 15/22 |
| | | 704/275 |
| 6,748,361 B1 | 6/2004 | Comerford et al. |
| 6,839,669 B1 * | 1/2005 | Gould .................. G10L 15/22 |
| | | 704/246 |
| 6,882,974 B2 | 4/2005 | James et al. |
| 7,487,095 B2 | 2/2009 | Hill et al. |
| 7,725,322 B2 | 5/2010 | Kwak et al. |
| 7,729,916 B2 * | 6/2010 | Coffman ........... G06F 17/30899 |
| | | 704/270 |
| 7,949,529 B2 * | 5/2011 | Weider ............. G06F 17/30864 |
| | | 704/235 |
| 7,962,344 B2 * | 6/2011 | Sharpe .................. G06F 3/167 |
| | | 379/88.28 |
| 8,073,681 B2 | 12/2011 | Baldwin et al. |
| 8,200,847 B2 * | 6/2012 | LeBeau ............... G01C 21/265 |
| | | 709/249 |
| 8,275,617 B1 | 9/2012 | Morgan et al. |
| 8,428,908 B2 * | 4/2013 | Lawler .................. G06N 3/006 |
| | | 702/184 |
| 8,452,602 B1 * | 5/2013 | Bringert .................. G06F 3/167 |
| | | 704/251 |
| 2002/0040297 A1 * | 4/2002 | Tsiao .................. G06F 3/16 |
| | | 704/257 |
| 2005/0021336 A1 | 1/2005 | Katsuranis |
| 2008/0010259 A1 * | 1/2008 | Feng .................. G06F 17/3087 |
| 2009/0150156 A1 * | 6/2009 | Kennewick ........ G06Q 30/0261 |
| | | 704/257 |
| 2010/0088100 A1 | 4/2010 | Lindahl |
| 2010/0114944 A1 | 5/2010 | Adler et al. |
| 2010/0312547 A1 | 12/2010 | Van Os et al. |
| 2011/0270615 A1 | 11/2011 | Jordan et al. |
| 2012/0089392 A1 * | 4/2012 | Larco .................. G10L 15/063 |
| | | 704/231 |
| 2012/0284247 A1 * | 11/2012 | Jiang ................ G06F 17/30867 |
| | | 707/706 |
| 2013/0110500 A1 * | 5/2013 | Feng .................. G06F 17/2282 |
| | | 704/9 |
| 2013/0110520 A1 | 5/2013 | Cheyer et al. |
| 2013/0132089 A1 * | 5/2013 | Fanty et al. .................. 704/270 |
| 2013/0332168 A1 * | 12/2013 | Kim .................. G10L 15/22 |
| | | 704/251 |
| 2014/0095167 A1 | 4/2014 | Lynch et al. |
| 2014/0095168 A1 | 4/2014 | Lynch et al. |
| 2014/0095171 A1 | 4/2014 | Lynch et al. |
| 2014/0095172 A1 | 4/2014 | Cabaco et al. |

* cited by examiner

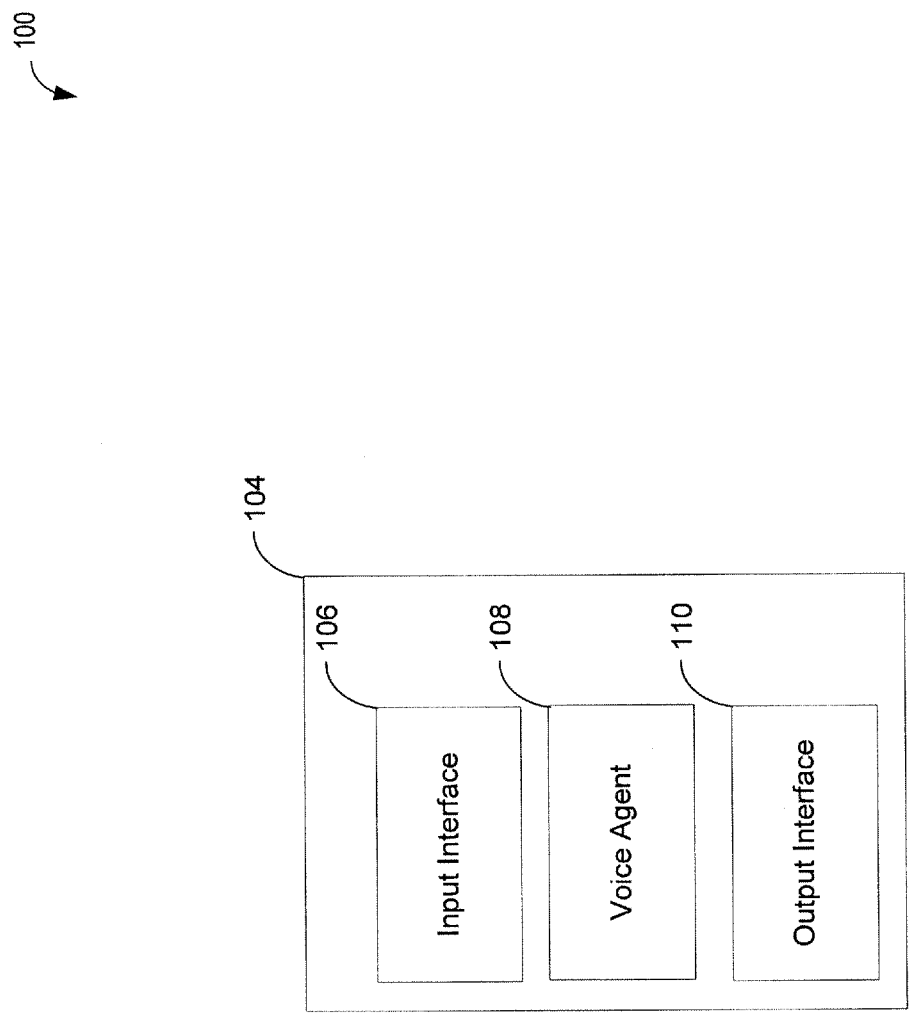
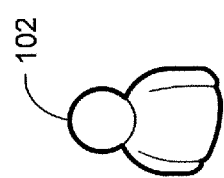
FIG. 1

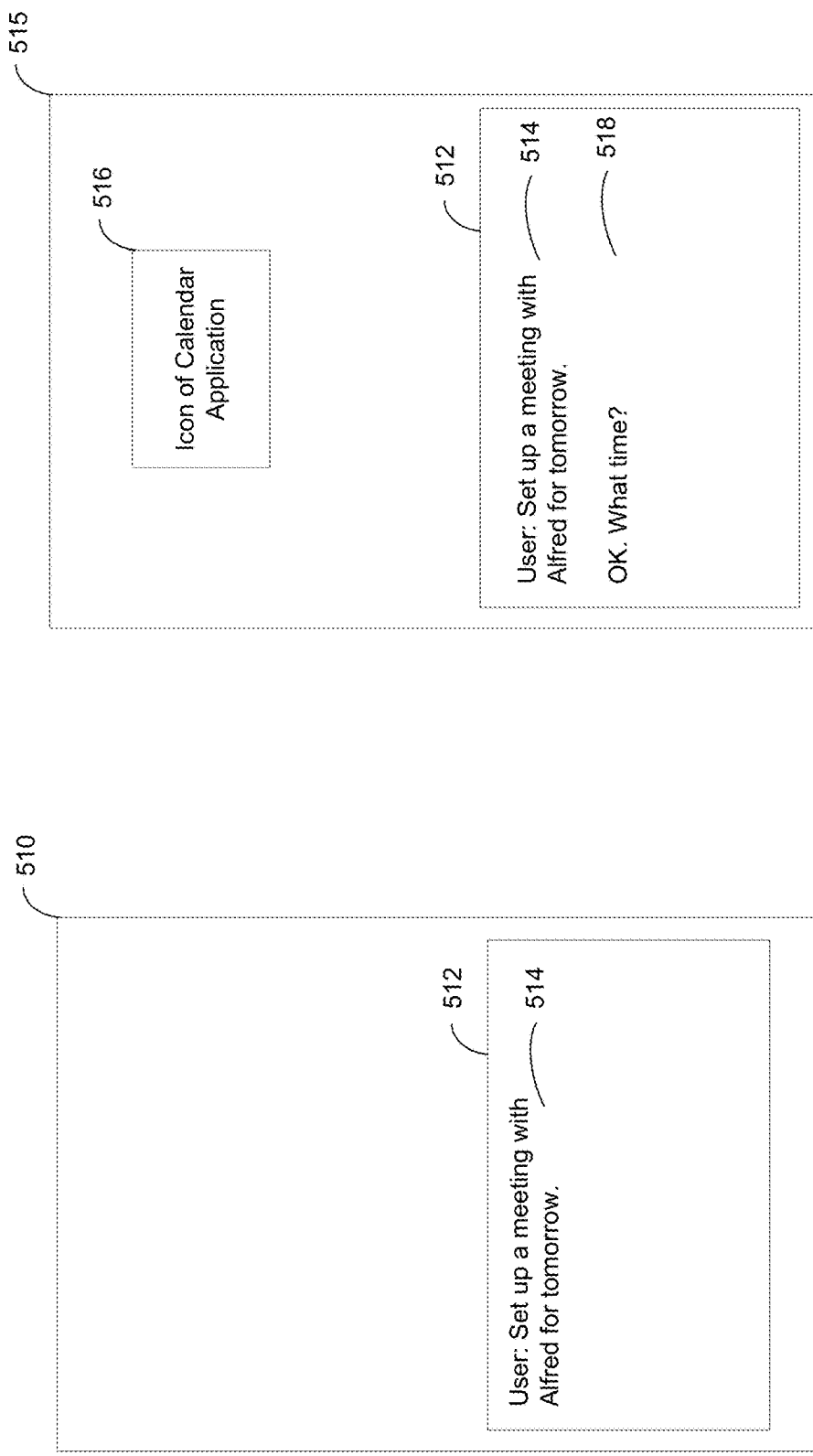

SYSTEMS AND METHODS FOR PROVIDING A VOICE AGENT USER INTERFACE

BACKGROUND

Voice agents provide a type of user interface that enables a person to interact with a computing device (e.g., a smart phone or other computing device). A voice agent may be configured to simulate a person, in some respects, so that the person interacting with the computing device with the help of a voice agent may be given the impression that he or she is interacting with another person rather than a machine. For example, the voice agent may allow the person to interact with the computing device by speaking to provide voice input to the voice agent. A conventional voice agent may interpret the voice input provided by the user, perform one or more actions based on the user's input, and "talk" back to the user by playing recorded and/or dynamically-generated speech to the user.

SUMMARY

Some embodiments of the present disclosure provide a computing device comprising at least one processor programmed to implement at least one voice agent. The at least one voice agent is configured to receive voice input; identify at least one application program as relating to the received voice input; and display at least one selectable visual representation that, when selected, causes focus of the computing device to be directed to the at least one application program identified as relating to the received voice input.

Other embodiments of the present disclosure provide a method performed by at least one voice agent. the method comprising receiving voice input; identifying at least one application program as relating to the received voice input; and displaying at least one selectable visual representation that, when selected, causes focus of the computing device to be directed to the at least one application program identified as relating to the received voice input.

Still other embodiments of the present disclosure provide at least one non-transitory computer-readable storage medium storing processor executable instructions that, when executed by at least one computing device, cause the at least one computing device to implement at least one voice agent that performs a method. The method comprises receiving voice input; identifying at least one application program as relating to the received voice input; and displaying at least one selectable visual representation that, when selected, causes focus of the computing device to be directed to the at least one application program identified as relating to the received voice input.

Still other embodiments of the present disclosure provide a computing device, comprising at least one processor programmed to implement at least one voice agent. The at least one voice agent is configured to determine that a received voice input specifies at least one action; trigger performance of at least one task in furtherance of the at least one action; and display at least one visual representation associated with the at least one action in response to the determining that the received voice input specifies the at least one action and before the at least one task is completed.

Still other embodiments of the present disclosure provide a method performed by at least one voice agent. The method comprises determining that a received voice input specifies at least one action; triggering performance of at least one task in furtherance of the at least one action; and displaying at least one visual representation associated with the at least one action in response to the determining that the received voice input specifies the at least one action and before the at least one task is completed.

Still other embodiments of the present disclosure provide at least one non-transitory computer-readable storage medium storing instructions that, when executed by at least one computing device, cause the at least one computing device to implement at least one voice agent that performs a method. The method comprises determining that a received voice input specifies at least one action; triggering performance of at least one task in furtherance of the at least one action; and displaying at least one visual representation associated with the at least one action in response to the determining that the received voice input specifies the at least one action and before the at least one task is completed.

The foregoing is a non-limiting summary of the invention, which is defined by the attached claims.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same or a similar reference number in all the figures in which they appear.

FIG. 1 shows an illustrative environment in which some embodiments may operate.

FIG. 5C illustrates another graphical user interface of a voice agent that presents a transcription of voice input provided to the voice agent, in accordance with some embodiments.

FIG. 5D illustrates another graphical user interface of a voice agent that presents a visual confirmation to a user that voice input provided to the voice agent has been understood by the voice agent, in accordance with some embodiments.

DETAILED DESCRIPTION

Figure 2:
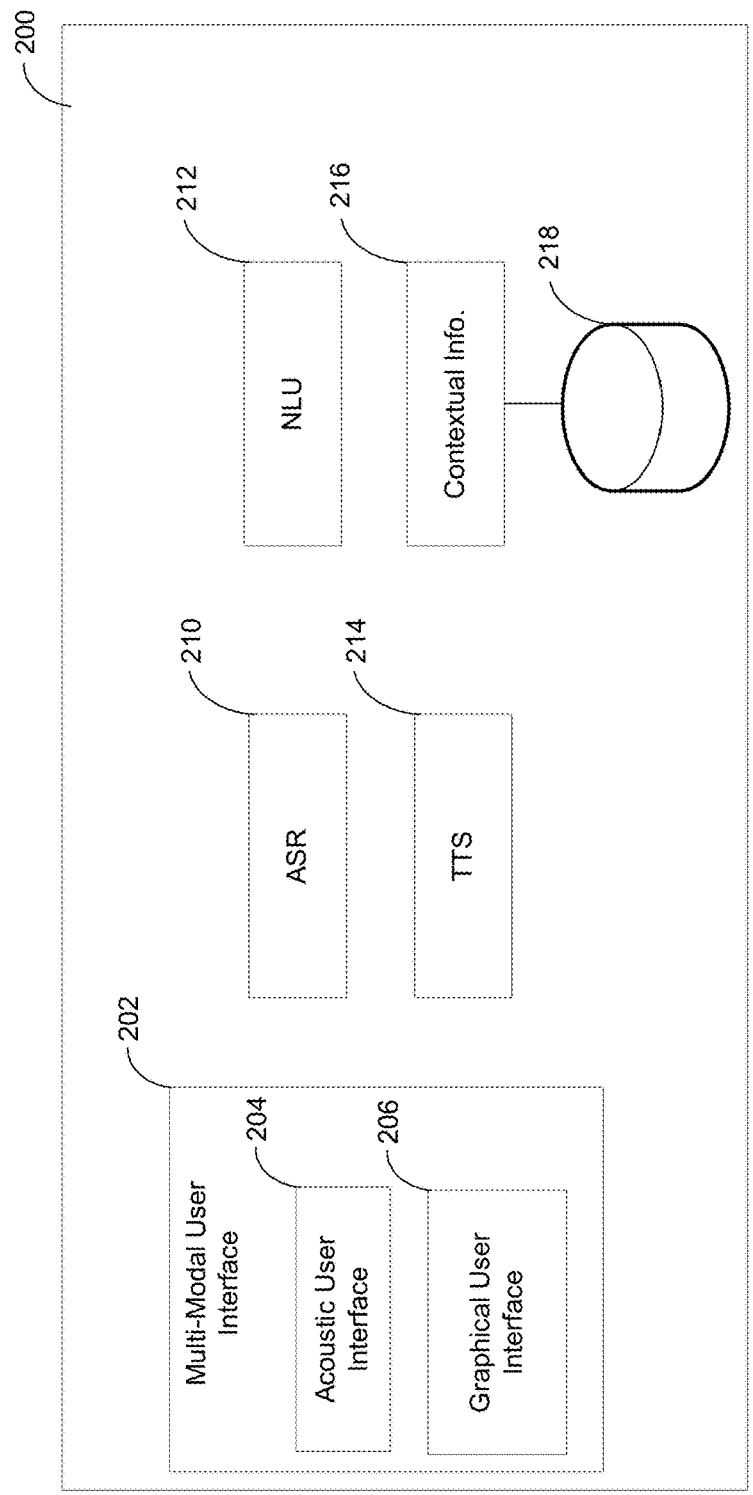
FIG. 2 is a block diagram of software components of an illustrative voice agent, in accordance with some embodiments.

The Applicants have appreciated that conventional voice agents are implemented as stand-alone application programs, providing little (if any) integration with other features, services, and/or application programs of the computing device or devices on which they are implemented. A user wishing to interact with a computing device with the help of a conventional voice agent has to invoke the voice agent (e.g., by pressing a button for a period of time), causing the focus of the computing device to be directed to the voice agent, before providing voice input to the voice agent. For example, if the user is using an application program on the computing device and invokes a voice agent, the focus of the computing device is shifted to the voice agent and away from the application program the user was using. As a result, a display of the computing device(s) may be updated so that the visual user interface of the voice agent is shown to the user instead of the visual user interface of the application program the user was using before the voice agent was invoked. The Applicants have appreciated that an improved user experience could be provided if the user did not have to interrupt what he/she is currently doing on the computing device to interact with the voice agent. Thus, some embodiments described herein relate to a voice agent that may be invoked without requiring that the user interrupt the application the user is interacting with when it is desired to invoke the voice agent.

The Applicants have also appreciated that when a conventional voice agent is invoked by a user, the voice agent does not have any information about the context in which the voice agent was invoked. For example, a conventional voice agent does not have any information about what application the user was interacting with prior to invoking the voice agent. The Applicants have appreciated that making contextual information available to the voice agent can provide a number of advantages (e.g., it may help the voice agent interact more efficiently with a user after the voice agent is invoked by requiring the user to provide less information to the agent). For example, if a user is viewing a web page with a browser application program and wishes to send an e-mail containing the uniform resource locator (URL), or web address, of that web page by using a conventional voice agent, the user will have to invoke the voice agent, instruct the voice agent to send an e-mail, and explicitly provide the URL of the web page to the voice agent because the voice agent does not have access to any information identifying the web page the user was viewing. Conversely, in accordance with some embodiments described herein, information about the context in which the voice agent was invoked is provided to the voice agent.

The Applicants have also appreciated that when a conventional voice agent is invoked by a user to perform an action (e.g., create a calendar appointment, send an e-mail, etc.), the user must provide the voice agent with all the information the voice agent needs to perform the action by speaking. For example, if a user were to use a conventional voice agent to add an appointment to the user's calendar, the user must use speech input to provide all information (e.g., time, date, location, and description of the appointment) the voice agent needs to create the appointment. As another example, if a user were to use a conventional voice agent to send an e-mail, the user must use speech input to provide all information (e.g., e-mail address, subject of the message, text of message) the voice agent needs to send the e-mail. The Applicants have appreciated that it would be advantageous to provide a voice agent that does not require a user to provide all input needed to specify a desired action via speech input.

Some embodiments described herein address all of the above-described issues that the Applicants have recognized with conventional voice agents. However, not every embodiment described below addresses every one of these issues, and some embodiments may not address any of them. As such, it should be appreciated that embodiments of the disclosure provided herein are not limited to addressing all or any of the above-discussed issues of conventional voice agents.

Some embodiments are directed to a voice agent that provides improved integration with other features, services, and/or application programs of the computing device on which the voice agent is implemented. In contrast to a conventional voice agent, the voice agent may be present and available to interact with the user while a graphical user interface of another application program is being presented to the user. As such, the voice agent may receive voice input from the user and present acoustic and/or visual feedback to the user, while the graphical user interface of the other application program is being presented to the user. This enables the user to interact simultaneously both with the voice agent and with the application program.

Accordingly, in some embodiments, an interface of a voice agent and an interface of another application program may be presented to the user concurrently. When a voice agent receives input from the user that at least partially requests an action to be performed via the other application program, visual feedback responsive to the input may be presented to the user concurrently via a user interface of the voice agent and a user interface of the application program.

In other embodiments, a voice agent may be provided that has access to information about the context in which input is provided to the voice agent. The voice agent may use this contextual information to interpret the user's input. The contextual information may comprise any suitable contextual information. As some non-limiting examples, contextual information may comprise information related to one or more interactions between the user and the voice agent, information related to one or more interactions between the user and one or more other application programs, information about a time when input is provided to the voice agent, a location of the computing device when input is provided to the voice agent, or any other suitable contextual information.

Accordingly, in some embodiments, a voice agent may be configured to receive voice input and access contextual information related to an application program that has the focus of the computing device when the voice input was received. The voice agent may use the contextual information to interpret the received voice input. For example, when the voice input specifies an action, the contextual information related to the application program may be used to identify a subject of the action to be performed. One non-limiting example, when a user viewing a web page using a web browser application program wishes to send an e-mail to a recipient containing the URL of that web page, the user may provide input to the voice agent by speaking "e-mail this web page to John Smith." The voice agent may access contextual information associated with the browser application program and use it to identify the URL of the web page that the user is viewing. As such, the voice agent may interpret the input "this web page" as identifying the web page the user is viewing and send the URL of the web page to the recipient. Using contextual information to identify a subject of input is merely one non-limiting example of the ways in which contextual information can be employed, as the embodiments directed to the use of contextual information are not limited in this respect.

In other embodiments, a voice agent may be configured to use contextual information gathered during a prior interaction between the voice agent and the user to interpret new voice input provided by the user. For example, a voice agent may be configured to receive voice input specifying a requested action and identify a subject of the requested action from the voice input and information related to a prior action invoked by the voice agent. For example, the subject of the requested action may be a person and information related to the prior action invoked by the voice agent may identify the person. As one non-limiting example, a user may provide input to the voice agent requesting that the voice agent create a calendar appointment with John Smith tomorrow at 11:00 am. Subsequently, the user may provide additional input to the voice agent by speaking "send him an e-mail with a reminder that the meeting is tomorrow at 11:00 am." The voice agent may use information from the prior action (i.e., scheduling a calendar appointment with John Smith) to identify that John Smith is the subject of the requested action (i.e., "him" refers to John Smith as the recipient of the e-mail) because John Smith was the subject of the prior action.

In some embodiments, a voice agent may interact with one or more application programs of the computing device, so that when a user wishes to use the voice agent to specify an action to be performed via an application program, the user need not provide all the input needed to fully specify the action by speaking. For example, the user may fully specify the action by using the voice agent, fully specify the action by using the application program, or fully specify the action by providing some input via the voice agent and other input directly via the application program.

Accordingly, in some embodiments, a voice agent may be configured to receive voice input from a user at least partially specifying an action to be performed via an application program. Multiple inputs may need to be specified for the action to be performed, and the user may at least partially specify the action by providing voice input specifying one or more of the required inputs. In response to receiving the voice input, the voice agent may make the application program accessible to the user prior to completion of performance of the action, so that the user may provide additional inputs and/or edit the already-specified inputs by interacting directly with the application program and/or by continuing to interact with the voice agent. As one non-limiting example, a user may provide voice input to a voice agent: "send an e-mail to John Smith." This input specifies that an e-mail is to be sent to John Smith using an e-mail application program, but specifies neither a subject for the e-mail nor text to go in the body of the e-mail. In some embodiments, the voice agent may trigger performance of at least some tasks in furtherance of the desired action of sending an e-mail (e.g., such tasks may include interacting with the e-mail application to create a new e-mail and populate the "to" field with the e-mail address for John Smith obtained from contacts information accessible to the voice agent), and may then make the e-mail application program accessible to the user so that the user may provide additional input such as the subject and/or text of the e-mail by using the e-mail application program and/or the voice agent. As another non-limiting example, voice input to a voice agent may be "send an e-mail to John Smith with the subject 'Dinner' and message 'Do you want to have dinner tomorrow'." The voice agent may perform the tasks of interacting with the e-mail application to fully prepare the requested e-mail, and may then make the e-mail application program accessible to the user so that the user may confirm and/or edit the e-mail (e.g., change the recipient from John Smith to Jane Doe) before the e-mail is sent by using the e-mail application program and/or the voice agent.

A voice agent may make an application program that is to be used to perform an action (such as the e-mail application program in the example above) accessible to the user in any suitable way. As previously described, in some embodiments, a voice agent may cause a visual user interface of the application program to be displayed to the user, either alone or concurrently with a visual user interface of the voice agent. In such embodiments, the user may provide and/or edit additional inputs by using the visual user interface of the application program (e.g., via a touchscreen, keyboard, mouse, etc.) and/or the user interface of the voice agent.

In some embodiments, a voice agent may make an application program accessible to the user by displaying a selectable (e.g., clickable) visual representation of the application program (e.g., an icon associated with the application program) via the visual user interface of the voice agent such that when the selectable visual representation is selected, the focus of the computing device is directed to the application program. In such embodiments, a user may provide input to the voice agent specifying an action. The voice agent may identify an application program to perform the action, and display a selectable visual representation of the application program (e.g., a selectable image, a selectable icon, a selectable screenshot, a selectable symbol, selectable text, etc.) that when selected by the user directs the focus of the computing device to the application program. In turn, the user may use the application program to provide additional input to fully specify the action, may edit input previously provided via the voice agent, and/or take any action that the application program supports.

The Applicants have also recognized that conventional voice agents do not provide a user with an indication that the voice agent understood the input provided by the user to the voice agent unless and until the voice agent performs the requested action or requests further information. Although some conventional voice agents show a user a textual transcription of what was recognized as the voice input before completing any action requested by the input, such feedback does not indicate to the user that the voice agent understood the meaning of the user's input. For example, having an automatic speech recognizer recognize that the voice input includes the utterance "send an e-mail to John Doe" is not the same as semantically understanding that the user would like the voice agent to perform an action by composing and sending an e-mail to John Doe. Showing a user the textual transcription "send an e-mail to John Doe," for example, does not provide the user with an indication that the voice agent understood that the user would like the voice agent to compose and send an e-mail.

The Applicants have appreciated that the user's experience in interacting with a voice agent would be improved if, while the voice agent were initiating one or more tasks in furtherance of an action requested in a user input, the agent were to provide confirmation to the user of the action that the voice agent understood to be requested in the input. Such confirmation provides more immediate feedback to the user that the voice agent has properly understood the input (as compared to waiting until the tasks(s) in furtherance of the action or the action itself is performed), and in some embodiments may allow the user to abort the operations undertaken by the voice agent if the input has been misunderstood. In some embodiments, the confirmation is visual (e.g., an icon, a symbol, an image, etc.), and provides an indication of a semantic meaning that the voice agent understood from the input and/or a specific action (e.g., sending an e-mail, making a calendar entry, etc.) that the voice agent understood the input to request.

Accordingly, in some embodiments, a voice agent may receive voice input specifying an action that comprises one or more tasks. The voice agent may trigger performance of one or more of these tasks in furtherance of the action, and may display a visual representation of the action before the task or tasks are completed. As one non-limiting example, a voice agent may receive voice input, "Add an appointment with John Smith tomorrow at 11 am," specifying that a new appointment is to be added to the user's calendar. Performing this action may comprise performing multiple tasks including, but not limited to, creating a proposed appointment in the calendar, and showing the proposed appointment to the user so that the user may confirm or cancel the created appointment before the new calendar entry is finalized. The voice agent may trigger performance of one or both of these tasks and display a visual representation of the understood action, such as a visual representation (e.g., an icon) of the calendar program, to the user before performance of one or both of these tasks is completed.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as the application is not limited in this respect.

Some embodiments of the present application may operate in the illustrative environment 100 shown in FIG. 1. In the illustrative environment 100, a user 102 may interact with a computing device 104 to access information via the computing device, provide input to the computing device, obtain output from computing device, use one or more application programs on the computing device, use an operating system executing on the computing device, perform one or more actions using one or more application programs on the computing device, perform one or more actions using the operating system on the computing device, and/or for any other suitable purpose.

User 102 may interact with computing device 104 at least in part by interacting with one or more voice agents, which computing device 104 may be programmed to implement. In the illustrated embodiment, computing device 104 is programmed to implement one voice agent—voice agent 108. However, it should be recognized that aspects of the disclosure provided herein are not limited in this respect, as the computing device 104 may be programmed to implement multiple voice agents.

Computing device 104 may be any electronic device with which user 102 may interact at least in part by using a voice agent. In some embodiments, computing device 104 may be a portable device such as a mobile smart phone, a personal digital assistant (PDA), a laptop computer, a tablet computer, or any other portable device with which user 102 may interact at least in part by using a voice agent. Alternatively, computing device 104 may be a fixed electronic device such as a desktop computer, a server, a rack-mounted computer, or any other suitable fixed electronic device with which user 102 may interact at least in part by using a voice agent.

User 102 may interact with computing device 104 by providing input to computing device 104. To this end, computing device 104 includes input interface 106 that allows a user to provide input. Input interface 106 may be any one or combination of input devices capable of receiving user input, and may vary depending on the type(s) of input computing device 104 supports. Input interface 106 may include any type(s) of component, alone or in any combination, that allows a user to provide input in any number of different ways, including, but not limited to, a microphone, a keyboard, a keypad, a touch screen, a mouse, a writing pad, an image capture device, etc.

Computing device 104 may provide output to user 102 in any suitable way. To this end, computing device 104 includes output interface 110 that allows computing device 104 to provide user 102 with output. Output interface 110 may be any one or combination of devices capable of providing output to a user. For example, output interface 106 may include one or more speakers that allow computing device 104 to provide acoustic output to user 102, and/or one or more displays that allow computing device 104 to provide visual output to user 102.

In some embodiments, the voice agent 108 may receive any type of input provided by user 102 (via input interface 106) to the computing device 104, process the provided input, perform one or more actions or tasks in furtherance thereof, based at least in part on the provided input, present user 102 with one or more outputs (via output interface 110) in response to the provided input, and/or perform any other suitable functions.

In some embodiments, the voice agent 108 may receive voice input from a user. The voice input may be any suitable input that a user may provide by voice. In some embodiments, the voice input may comprise one or more utterances from a pre-defined set of utterances (i.e., a fixed grammar) that the voice agent is configured to process. However, in other embodiments, a user is not limited to providing voice input to a voice agent by speaking one or more utterances from a fixed grammar and, for example, may provide voice input by speaking naturally. As such, in some embodiments, voice input may comprise natural language input and a voice agent may be configured to process the natural language input using any suitable speech processing and/or natural language understanding techniques. The speech processing and natural language understanding techniques may be fully performed by computing device 104, fully performed by one or more other computing devices to which computing device 104 has access (e.g., one or more web servers to which computing device 104 has access), or may be performed at least in part by computing device 104 and at least in part by one or more other computing devices (e.g., one or more web servers) to which computing device 104 has access.

In some embodiments described below, the voice agent is not limited to receiving voice input from a user and may also receive any of the other types of inputs that may be provided to computing device 104 via input interface 106. However, it should be appreciated that not all embodiments are limited in this respect, and that aspects described herein can be employed with voice agents limited to receiving voice input.

In some embodiments, a voice agent may identify one or more actions to be performed based at least in part on input provided by a user. This may be done in any suitable way. For example, a user may provide input (e.g., voice input and/or any other type of input) specifying, directly or indirectly, one or more actions the user is requesting be performed, and a voice agent may identify the specified action(s) from the provided input. As one non-limiting example, the user may provide voice input "Send an e-mail to John Doe," and the voice agent may identify that sending an e-mail is an action the user is requesting to be performed. As another non-limiting example, the user may provide voice input "create a new calendar appointment with Al Jones tomorrow at 3 pm," and the voice agent may identify that creating a calendar appointment is an action the user is requesting to be performed. The action specified by the input may be identified by the voice agent in any suitable way. For example, in some embodiments, the voice agent includes (or communicates with) an automatic speech recognition (ASR) engine that recognizes the user's speech and a natural language understanding (NLU) engine that analyzes the recognized speech to determine an action intended by the user. These components can be implemented separately or integrated in any suitable way (many examples of which are known), as aspects of the disclosure provided herein are not limited to any type of ASR engine or any type of NLU engine.

Input provided by a user may specify any of numerous types of actions. In some embodiments, input provided by a user may specify one or more actions to be performed, at least in part, by using one or more other application programs local to or remote from the computing device 104. In two non-limiting examples discussed above, inputs provided by the user specified an action to be performed, at least in part by, using an e-mail application program and a calendar application program which both run, at least partially, on the computing device 104. Other non-limiting examples of application programs include, but are not limited to, one or more application programs for performing communications (e.g., calling, texting, and/or sending e-mail), a contacts application program, a map application program (e.g., a program allowing a user to find and/or obtain directions to a location of interest), an application program configured to display photographs and/or videos, an application program configured to play, download, and/or purchase media (e.g., music, videos, movies, etc.), a web browser application program that provides access to other web-accessible application programs and/or services, an application program providing dedicated access to a particular web application and/or service (e.g., an application program proving dedicated access to a social networking service such as Twitter® or Facebook®, an application program to provide dedicated access to other types of web services, etc.), a clock application program, an alarm application program, and an application program for taking notes.

In some embodiments, a voice agent may perform one or more tasks in furtherance of a user-requested action identified based at least in part on input provided by the user. For example, when the action is to be performed at least in part by using an application program, the voice agent may perform one or more of: launching the application program (e.g., via a call to an operating system of the computing device), providing input to the application program (e.g., via a call to the API of the application program), making the application program accessible to the user, causing the application program to begin a process of formulating the action, etc. As another example of a task in furtherance of a requested action, the voice agent may gather additional input from the user to further specify the action to be performed. It should be recognized that these are non-limiting and illustrative examples, and that a voice agent may perform any suitable task in furtherance of an action to be performed, as aspects of the disclosure provided herein are not limited in this respect.

In some embodiments, a voice agent may provide output to the user at any suitable time and for any suitable reason. For example, the voice agent may provide output to the user in response to receiving input from the user. For example, in some embodiments, a voice agent may provide the user with a confirmation that the voice agent received input from the user, a confirmation of what the voice agent understood the meaning of the received input to be, an indication that the voice agent did not understand the meaning of the received input, an interface (e.g., a prompt) for obtaining additional information from the user, output indicating that one or more actions specified in the input were at least partially performed, output containing information requested by the user, and/or any other suitable output, as aspects of the disclosure provided herein are not limited in this respect.

A voice agent may provide any suitable type of output to a user. In some embodiments, voice agent 108 may provide any type of output to user 102 that output interface 110 supports. For example, voice agent 108 may provide user 102 visual output using one or more displays, acoustic output using one or more speakers, tactile output (e.g., by causing computing device 104 to vibrate), and/or any other suitable output.

Embodiments of a voice agent as described herein may be implemented in hardware, software, or as a combination of hardware and software (e.g., as processor-executable instructions stored on at least one non-transitory computer readable medium that, when executed by one or more processors, perform the functionality of a voice agent). One embodiment of a voice agent that is implemented, at least in part, by using software is illustrated in FIG. 2, which shows a block diagram of software components of an illustrative voice agent 200. It should be recognized that the software components shown in FIG. 2 are merely illustrative and that a voice agent may be implemented by using other software components in addition to or instead of the software components shown in FIG. 2. Any suitable computing device, such as computing device 104, or collection of two or more computing devices, may be programmed to implement voice agent 200, as aspects of the disclosure provided herein are not limited in this respect.

Illustrative voice agent 200 comprises a multi-modal user interface (UI) component 202 for supporting interaction between a user and the voice agent in two or multiple modes. In the illustrative embodiment shown in FIG. 2, multi-modal UI component 202 comprises acoustic UI component 204 and graphical UI component 206.

As previously mentioned, a voice agent may be configured to receive voice input from a user and present a user with acoustic output. Such functionality may be performed at least in part by acoustic UI component 204. To interact with a user by using speech, acoustic UI component 204 may use any suitable technology such as automatic speech recognition (ASR) and/or text-to-speech synthesis (TTS) technology. In the illustrated embodiment, such functionality may be provided by ASR engine 210 and TTS engine 214, respectively. Furthermore, as discussed above, in some embodiments the user's speech is unconstrained and the user may speak naturally. In such embodiments, the voice agent may further include (or have access to) a natural language understanding (NLU) component 212.

ASR engine 210 may be configured to process any voice input provided to the voice agent 200 by a user and produce a textual representation of the voice input, and comprises one or more computer programs that, when executed by at least one computing device (e.g., computing device 104 or any other suitable computing device(s) or processor(s)), are configured to do so. For example, ASR engine 210 may be configured to perform speech recognition on input acoustic waveforms provided to the voice agent 200 using one or more acoustic models, language models, dictionaries, vocabularies, grammars and/or any combination of these or other suitable ASR techniques, as aspects of the disclosure provided herein are not limited by the specific implementation of the ASR engine.

NLU component 212 may be configured to interpret any voice input provided to the voice agent 200 by a user, and comprises one or more computer programs that, when executed by at least one computing device (e.g., computing device 104 or any other suitable computing device(s) or processor(s)), are configured to do so. As such, the NLU component 212 may be used to understand the meaning of voice input provided to the voice agent. NLU component 212 may be configured to interpret voice input in any suitable way and using any suitable natural language understanding technique or techniques, as aspects of the disclosure provided herein are not limited in any way by the specific implementation of the NLU component.

In some embodiments, NLU component 212 may be configured to interpret voice input at least in part by analyzing its corresponding textual representation, which may be produced by ASR engine 210. As such, although in the illustrated embodiment NLU component 212 is separate from ASR engine 210, in other embodiments, ASR engine 210 and NLU component 212 may be part of the same component, as aspects of the disclosure provided herein are not limited in this respect.

In some embodiments, NLU component 212 may be additionally configured to interpret voice input based at least in part on the context in which the voice input was provided to the voice agent. As previously mentioned, such contextual information may be any information related to one or more interactions between the user and the voice agent, information related to one or more interactions between the user and one or more other application programs, and/or any other suitable type of contextual information (examples of which are described herein).

In some embodiments, NLU component 212 may obtain contextual information from contextual information component 216. Contextual information component 216 may be configured to access (and/or be provided with) information related to one or more interactions between the user and the voice agent. Additionally or alternatively, contextual information component 216 may be configured to access information related to one or more interactions between the user and one or more other application programs.

Contextual information component 216 may be configured to access information related to one or more interactions between the user and one or more other application programs in any suitable way. Contextual information component 216 may access this information by interfacing with the other application program(s). For example, contextual information component 216 may be configured to interface with the other application program(s) via an operating system of the computing device, by using an application programming interface (API) or interfaces of the other application(s), and/or in any other suitable way, as aspects of the disclosure provided herein are not limited in this respect. It should be appreciated that the above examples are merely illustrative and that contextual information component 216 may be configured to access any other suitable contextual information, as aspects of the disclosure provided herein are not limited in this respect.

A voice agent may be configured to store any contextual information for subsequent access. For example, the voice agent may be configured to store any information input by the user to the voice agent, information output to the user by the voice agent, information identifying any application programs invoked and/or accessed by the voice agent, information provided to the voice agent by the operating system of the computing device, information provided to the voice agent by any application program executing, at least in part, on the computing device, actions previously invoked by the voice agent (e.g., in response to user input), and/or any other suitable information.

A voice agent may be configured to store contextual information in any suitable way. In one illustrative embodiment, a voice agent may be configured to store contextual information in contextual information store 218 and to access any contextual information stored therein. Contextual information store component 218 may be configured to store information in any suitable way. For example, contextual information store component 218 may use one or more non-transitory computer-readable storage media, examples of which are described below with reference to FIG. 9. In some embodiments, including the embodiment of FIG. 2, the contextual information store 218 may be local to the user's computing device. In other embodiments, at least a portion of the contextual information store may be remotely located and accessible by the user's computing device using one or more networks (e.g., Internet, telephone network, etc.).

In some embodiments, NLU component 212 may interpret voice input at least in part by identifying an action to be performed based at least in part on the voice input. NLU component 212 may identify the action to be performed in any suitable way. In some embodiments, NLU component 212 may identify the action to be performed based on its association with one or more recognized words (e.g., one or more keywords) in the voice input. As one non-limiting example, if the voice input "I want to send an e-mail to John Doe" is determined (e.g., by ASR component 210) to contain the words "send an e-mail," the NLU component 216 may interpret the presence of these words as an indication of the user's intent that an action of sending an e-mail is to be performed. As another non-limiting example, if the voice input "Update my status to 'having a blast with friends'" is determined (e.g., by ASR component 210) to contain the words "update my status," the NLU component 216 may interpret the presence of these words as an indication of the user's intent that an action of updating the user's status on Facebook® is to be performed. In some embodiments, NLU component 212 may identify an action to be performed by using one or more statistical models, trained on one or more corpora, to analyze the voice input and determine the probability or likelihood that a particular action is the action being requested by the user, although other techniques can be used, as the aspects of the disclosure described herein are not limited to the use of any particular NLU technology.

It should be appreciated that NLU component 212 is not limited to interpreting voice input and may be used to interpret any of numerous other types of input that may be provided to voice agent 200. For example, NLU component may be used to interpret text input provided to the voice agent by typing, writing, and/or in any other suitable way.

TTS engine 214 may be configured to convert a textual representation of content into synthesized speech, and comprises one or more computer programs that, when executed by at least one computing device (e.g., computing device 104 or any other suitable computing device(s) or processor(s)), are configured to do so. TTS engine 214 may use concatenative synthesis, formant synthesis, model-based synthesis, articulatory synthesis, HMM-based synthesis, sinewave synthesis, or any other approach to speech synthesis, as aspects of the disclosure provided herein are not limited by the specific implementation of the TTS engine. For example, in some embodiments, TTS engine 214 may be configured to present recorded acoustic waveforms to the user.

Although shown as part of the voice agent 200 in FIG. 2, it should be appreciated that each of ASR engine 210, NLU component 212, and TTS engine 214 may be implemented separately from voice agent 200 and communicate with voice agent 200. Accordingly, functionality performed by ASR engine 210, NLU component 212, and TTS engine 214 may be fully performed locally by a computing device programmed to implement voice agent 200 (e.g., computing device 104), fully performed remotely by one or more other computing devices to which the computing device programmed to implement voice agent 200 has access (e.g., one or more web servers accessible via a network such as an Intranet or the Internet), or performed at least in part locally and at least in part remotely. In some embodiments, functionality performed by ASR engine 210, NLU component 212, and TTS engine 214 may be performed at least in part remotely when the computing device (e.g., a mobile device) programed to implement voice agent 200 has limited resources (e.g., processing power, memory, etc.). When at least a portion of the functionality performed by ASR engine 210, NLU component 212, and TTS engine 214 is performed remotely by one or more remote computing devices, the remote computing device(s) may be provided with any suitable information accessible by voice agent 200 (e.g., voice input provided to the voice agent 200, contextual information accessible by the voice agent 200, etc.) for performing such functionality.

In some embodiments, the voice agent may be configured to interact with a user via one or more graphical user interfaces. The voice agent may use a graphical user interface (GUI) to obtain input from a user and/or to present visual output to the user. Such functionality may be performed at least in part by graphical user interface (GUI) component 206 of voice agent 200. GUI component 206 may be configured to obtain input from the user and/or present information to a user using any suitable type(s) of graphical user interface.

In some embodiments, a voice agent may be configured to obtain input from a user and/or provide output to the user, when the computing device is operating in a so-called "voice-agent-only" mode. When operating in the voice-agent-only mode, the computing device may be configured to present a GUI of the voice agent to the user without simultaneously presenting the user with a separate GUI of any other application program. As such, in the voice-agent-only mode, a GUI of the voice agent may not be presented concurrently or simultaneously with a GUI of any other application program. In a voice-agent-only mode, the voice agent may have the focus of the computing device, but no other application program may have the focus of the device. In a voice-agent-only mode, a user may not interact directly with another application program. It should be appreciated that, as used herein, an application program is different from an operating system, and that the reference herein to the computing device operating in the voice-agent-only mode is not meant to preclude the computing device from presenting a GUI of the operating system concurrently with a GUI of the voice agent.

In some embodiments, the voice agent may present the user with a visual representation of another application program (e.g., an icon, a short cut, a screenshot) that may be selected to launch or redirect the focus of the computing device to the other application program. The selectable visual representation may be presented via the user interface of the voice agent rather than via a GUI of the other application program.

Figure 3:
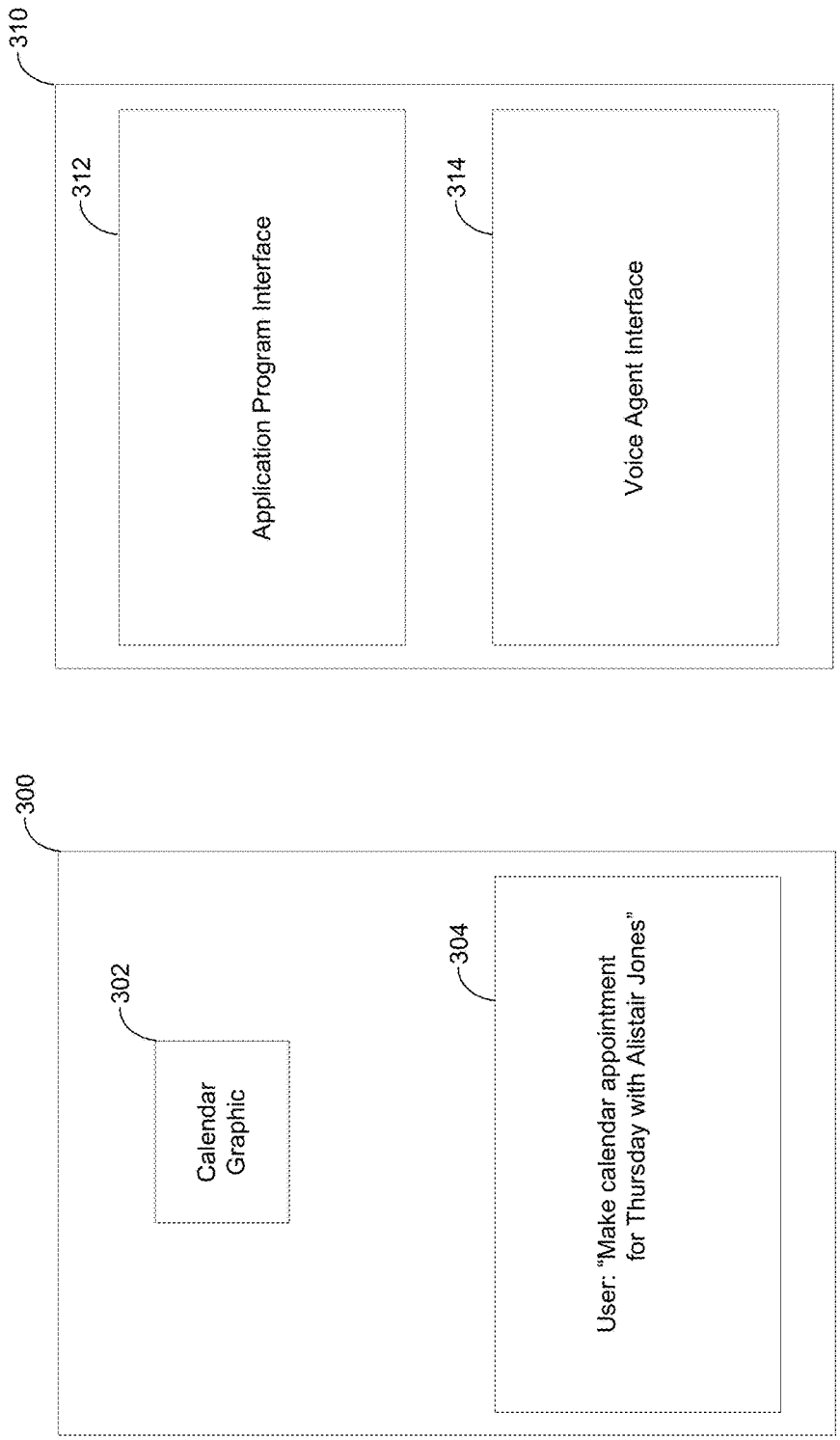
FIG. 3A illustrates a graphical user interface of a voice agent that presents a selectable visual representation of an application program, when selected, directs the focus of the computing device from the voice agent to the represented application program, in accordance with some embodiments.
FIG. 3B illustrates a graphical user interface of a computing device, in which a graphical user interface of an application program is shown concurrently with a graphical user interface of the voice agent, in accordance with some embodiments.

FIG. 3A illustrates a graphical user interface 300 of a computing device when the computing device is in the voice-agent-only mode. Graphical user interface 300 comprises a visual representation area 302 and conversational flow area 304. As discussed in greater detail below, visual representation area 302 may show a visual representation of an application program that, when selected (e.g., clicked, tapped, etc.), may cause the focus of the computing device to be directed to the represented application program. For example, the visual representation may be a selectable icon associated with a calendar application that, when selected, directs the focus of the computing device to the calendar application. After the focus of the computing device is directed to the calendar application, the computing device is no longer in voice-agent-only mode, as a GUI of the calendar application may be presented to the user either on its own or concurrently with a GUI of the voice agent.

Conversational flow area 304 may show one or more inputs provided by a user to the voice agent and/or one or more outputs presented to the user by the voice agent. For example, conversational flow area 304 may show a textual transcription of voice input provided by the user and/or acoustic responses provided to the user by the voice agent.

It should be appreciated that interface 300 is merely illustrative and that variations of interface 300 are possible. For example, even though visual representation area 302 is shown above conversational flow area 304, aspects of the disclosure provided herein are not limited in this respect, as visual representation area 302 may be presented in any suitable way relative to conversational flow area 304. For example, visual representation area 302 may be shown below, to the left of, to the right of, and/or at least partially overlaid (with or without transparency) onto conversational flow area 304.

In some embodiments, a computing device may operate in modes other than the voice-agent-only mode and in which a voice agent may be configured to obtain input from a user and/or provide output to the user. For example, a computing device may be configured to concurrently present a graphical user interface of the voice agent and a graphical user interface of another application program to the user. In this case, a user may be presented with visual output concurrently from the GUI of the voice agent and from the GUI of the other application program.

FIG. 3B illustrates a graphical user interface 310 of a computing device, in which a graphical user interface 312 of an application program is shown concurrently with a graphical user interface 314 of the voice agent. Although the GUI 312 of the application program is shown above the GUI 314 of the voice agent in FIG. 3B, aspects of the disclosure provided herein are not limited in this respect, as GUI 312 may be presented in any suitable way relative to GUI 314. For example, GUI 312 may be shown below, to the left of, to the right of, and/or at least partially overlaid (with or without transparency) onto GUI 314.

Figure 4:
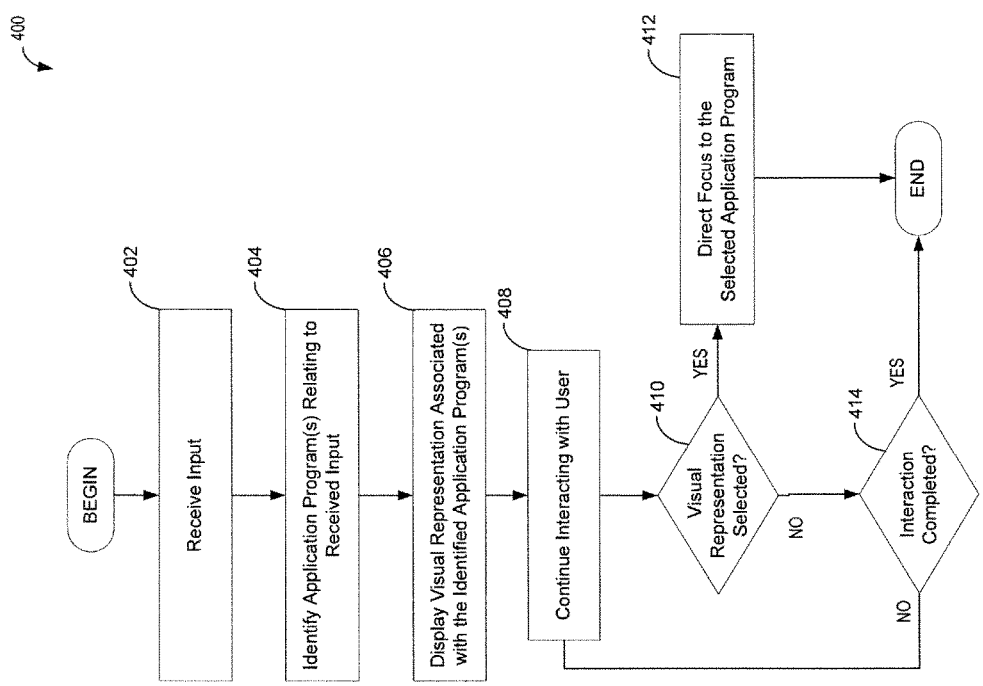
FIG. 4 is a flow chart of an illustrative process for providing visual confirmation to a user that voice input provided to a voice agent has been understood by the voice agent prior to completion of an action invoked thereby, in accordance with some embodiments.

As previously described, in some embodiments the computing device may provide a visual confirmation to a user that the voice input provided by the user to the voice agent has been understood by the voice agent prior to completion of an action invoked by the voice input. One such embodiment is illustrated in FIG. 4, which shows a flow chart of illustrative process 400 that can be performed by any computing device programmed to implement at least one voice agent and, for example, may be performed by computing device 104 described with reference to FIG. 1.

Process 400 begins at act 402, where a voice agent receives input from a user. The received input may be voice input or any of the other previously described types of input. In cases where the received input is voice input, the voice input may be any suitable type of voice input including, but not limited to, natural language input or one or more utterances from a grammar. The input may be received as part of input received by the computing device executing process 400 to invoke the voice agent. For example, the input may include voice input comprising a particular utterance (e.g., a keyword or a phrase) that when received by the computing device causes the voice agent to be invoked. Alternatively, the input may be received as part of input received by the computing device after the voice agent has already been invoked.

After input is received, the process 400 proceeds to act 404, where the voice agent may identify one or more application programs as relating to the received input. The voice agent may identify an application program as relating to the received input in any suitable way. In some embodiments, the input may specify an application program explicitly. As one non-limiting example, the input may specify an application program explicitly when the input is a command to launch the application program. For instance, when the received input is "launch maps," the voice agent may identify a map application program as relating to the received input.

In some embodiments, the input may specify one or more actions but not any application program explicitly, and the voice agent may identify an application program as relating to the received input by determining that the action(s) may be performed at least in part by using the at least one application program. As one non-limiting example, the received input may specify that the user requests to send a text message (e.g., "send message 'I'm here' to Joe Stein"). The voice agent may determine that the action of sending a message may be performed, at least in part, by an application program for sending text messages, thereby identifying this application program as relating to the received input. As another non-limiting example, the received input may specify that the user requests to create a new appointment (e.g., "create an appointment tomorrow with Joe Stein at 10 am"). The voice agent may determine that the action of creating a new appointment may be performed, at least in part, by a calendar application program, thereby identifying this application program as relating to the received input. As another non-limiting example, the received input may specify that the user requests to send an e-mail (e.g., "send an e-mail to Alice Bloom"). The voice agent may determine that the action of sending e-mail may be performed, at least in part, by an e-mail application program, thereby identifying this application program as relating to the received input. As yet another non-limiting example, the received input may specify that the user requests to obtain directions to a location (e.g., "How do I get to the nearest gas station?"). The voice agent may determine that the request seeks directions, and that the action of providing directions may be performed, at least in part, by a map application program, thereby identifying this application program as relating to the received input. It should be appreciated that the above examples of actions specified in received input and application programs that may be used to at least partially perform these actions are illustrative, as aspects of the disclosure provided herein are not limited in this respect.

In some embodiments, the received input may specify any suitable type of service and may specify a service performed, at least in part, by one or more electronic devices other than the user's computing device. The computing device may be configured to provide the user with access to the service by communicating with the other electronic device(s) using one or more networks of any suitable type (e.g., via the Internet, a corporate Intranet, a mobile telecommunications network, etc.). For example, the received input may specify a web-based service performed, at least in part, by one or more servers that may be accessed via the Internet. Some web-based services may be accessible by a plurality of users each having an account with the web-based service, whereas other web-based services may not require a user to have an account. Examples of web-based services include, but are not limited to, social-networking services (e.g., Facebook®, Twitter®, LinkedIn®, etc.), video-streaming services (e.g., YouTube®, Hulu®, etc.), and music provisioning services (Pandora®, ITunes®, etc.). A web service may be accessed by a general-purpose browser executing on the user's device, or may be accessible by a special purpose application program executing on the user's device that is dedicated to providing access to the web service.

Accordingly, in some embodiments, the received input may specify a service and the voice agent may identify an application program as relating to the received input as one that may provide access to the service. When the service is a web-based service, some illustrative and non-limiting examples of which have been provided above, the voice agent may identify a web-browser application program as one that may provide access to the service, thereby identifying the web-browser application program as relating the received input. Additionally or alternatively, the voice agent may identify an application program dedicated to providing access to the web-based service as relating to the received input. For web-based services that have user accounts, an application program dedicated to providing access to such a web-based service may do so at least in part by using information associated with the account that the user of the computing device executing process 400 may have with the web-based service. As one non-limiting illustration of the above, a social networking service application program (e.g., Twitter® application program) may provide dedicated access to the social networking service, as it does not provide access to any other services. A web-based browser application program may also provide access to the social networking service. Accordingly, a voice agent may identify either one or both of these application programs as ones that may provide access to the social networking service, thereby identifying either one or both of these application programs as relating to the received input.

In the above-mentioned example, the voice agent may identify two application programs as relating to received input. As such, it should be appreciated that a voice agent may identify one, or two, or more application programs as relating to the received input, as aspects of the disclosure provided herein are not limited in this respect. In one embodiment, the voice agent may give preference to any application program that provides dedicated access to a web-based service and identify such an application program, if installed, as relating to the received input and a general-purpose browser if no such application program is installed, but all embodiments are not limited in this respect.

Regardless of the manner in which a voice agent identifies an application program as relating to received input, process 400 next proceeds to act 406, where the voice agent may display a visual representation of the identified application program. Displaying the visual representation of the application program to the user provides an indication to the user that the voice agent understood the input provided by the user to be related to the displayed application program. For example, if a user provided input specifying a requested action, displaying a visual representation of an application program that may be used to perform, at least in part, the requested action may provide the user with an indication of the action that the voice agent understood to be requested by the user. If the voice agent has correctly identified the user's desired intent, the visual confirmation of the user's intent before the action is completed can be reassuring for the user. Conversely, if the visual representation indicates that the voice agent misunderstood the user's intent, the user may take any suitable action (e.g., pressing a button on the device) to abort the agent's action. In this way, inconvenience to the user is minimized, rather than having the user wait until the voice agent fully completes the action before realizing that the voice agent misunderstood the user's intent.

The visual representation may be any suitable type of representation, as aspects of the disclosure provided herein are not limited in this respect. In some embodiments, the visual representation may be an icon of the identified application program, a screenshot of the identified application program, and/or any other content (e.g., a symbol, text, image, etc.) indicative of the identified application program. For instance, when the application program identified as relating to the received input is an e-mail application program, the visual representation may comprise an image of an envelope, an icon of the e-mail application program, a screenshot of the e-mail application program, text indicating the name of the e-mail application program, and/or any other content indicating that the application program identified by the voice agent based on the received input is an e-mail application program.

In some embodiments, the voice agent may display a visual representation of an application program in a user interface of the voice agent. The visual representation may be displayed in any suitable portion of the graphical user interface of the voice agent, and in any suitable configuration relative to other items being displayed in the graphical user interface of the voice agent. For instance, the visual representation may be displayed above, below, to the left, to the right, and/or at least partially overlaid on (with or without transparency) any other item displayed in the graphical user interface of the voice agent. In some embodiments (e.g., as illustrated in FIG. 3A), the visual representation may be displayed above a conversational flow area, but aspects of the disclosure provided herein are not limited in this respect.

In some embodiments, where two or more application programs are identified as relating to received input, the voice agent may be configured to display a visual representation of each of the identified application programs. This may be done in any suitable way. For example, in some embodiments, the visual representations may be displayed using a carousel. The carousel may comprise a number of slots, each of which corresponds to a visual representation of an application program identified as relating to the received input.

In some embodiments, the displayed visual representation of an application program may be selectable so that, when selected, the focus of the computing device (executing process 400) is directed to the application program. A selectable visual representation may be selected in any suitable way. For example, a user may select the visual representation by tapping an area of a touch screen corresponding to the visual representation with his finger, a stylus, or in any other suitable way. As another example, a user may select the visual representation by using a mouse, a keyboard, a touch pad, or any other suitable input device, as aspects of the disclosure provided herein are not limited in this respect. As a further example, the visual representation may be selected by voice (e.g., via the user speaking an identifier of the associated application program).

After a selectable visual representation associated with an application program identified as relating to the received input is displayed in act 406, process 400 proceeds to act 408, where the voice agent may continue to interact with a user in any suitable way. For example, the voice agent may receive additional input from the user and/or provide any suitable output to the user.

Figures 5A, 5B:
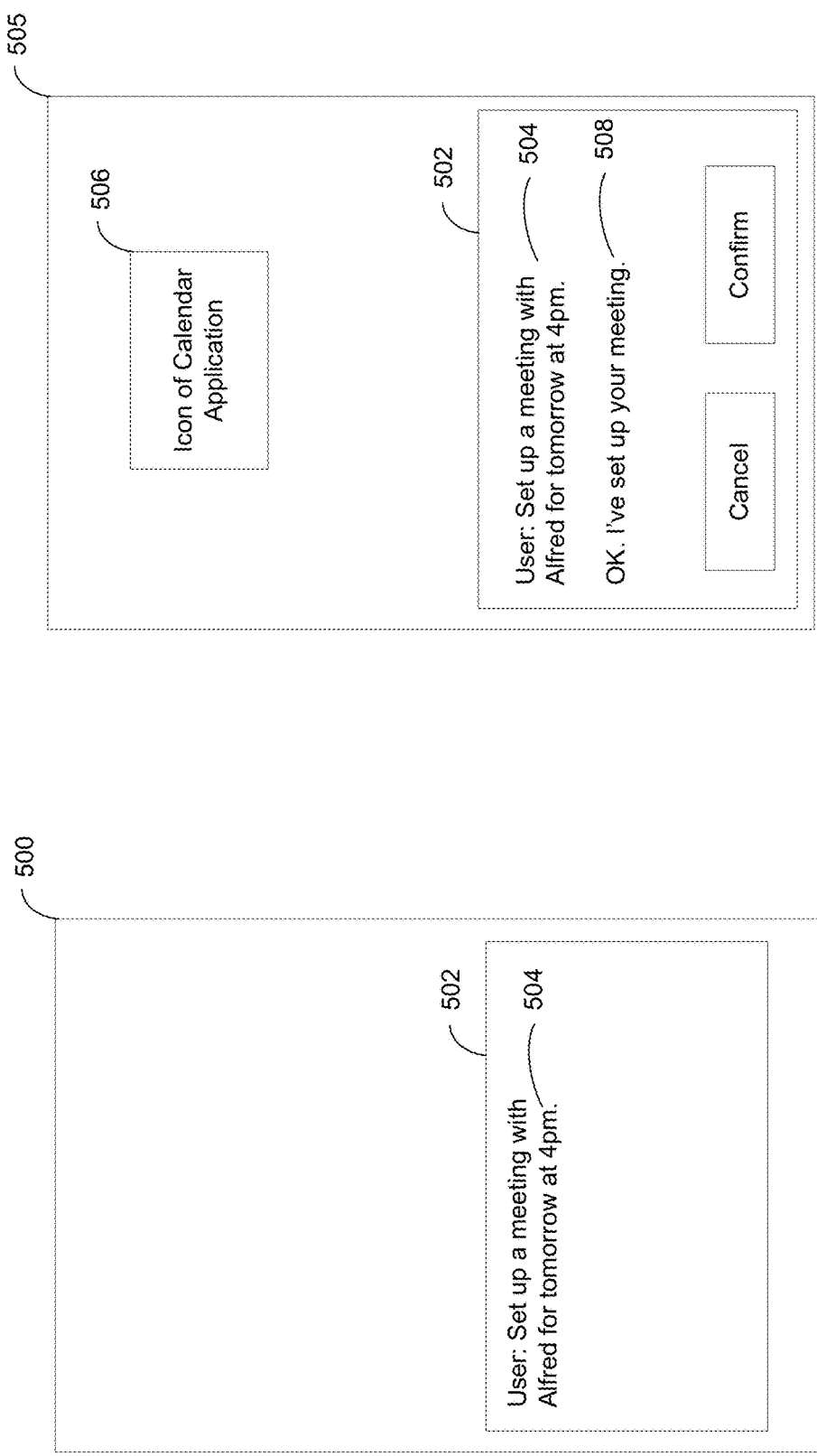
FIG. 5A illustrates a graphical user interface of a voice agent that presents a transcription of voice input provided to the voice agent, in accordance with some embodiments.
FIG. 5B illustrates a graphical user interface of a voice agent that presents a visual confirmation to a user that voice input provided to the voice agent has been understood by the voice agent, in accordance with some embodiments.

A non-limiting illustrative example of acts 402-408 of process 400 is shown in FIGS. 5A-5B, which illustrate showing a visual confirmation to a user that voice input provided to the voice agent has been understood by the voice agent. FIG. 5A illustrates a graphical user interface 500 of a voice agent comprising conversational flow area 502, which may show a textual transcription of input received by a voice agent, output presented by the voice agent, and/or any other suitable content. In the illustrated example, the voice agent receives voice input "Set up a meeting with Alfred for tomorrow at 4 pm" from a user, processes the received voice input, and displays the corresponding textual transcription 504 in conversational flow area 502. Based on this input, which specifies an action that may be at least partially performed by using a calendar application program, the voice agent identifies the calendar application program as an application program relating to the received input.

After the voice agent identifies the calendar application program as relating to the received input, the voice agent displays a visual representation 506 of the calendar application program above the conversational flow area 502, as shown in FIG. 5B. The visual representation 506 provides the user with a confirmation that the voice agent understood the action requested by the user. In one embodiment, visual representation 506 is an icon of the calendar application program, but may be any other suitable visual representation identifying the calendar application program. Next, the voice agent continues to interact with the user. In the illustrated example, the voice agent provides an acoustic output of "OK. I've set up your meeting" to the user, and provides a corresponding textual transcription 508 in conversational flow area 502. Additionally, the voice agent provides the user with an opportunity to confirm or cancel the requested action prior to the voice agent completing the requested action. This can be done in any suitable way. In the illustrative example shown, the voice agent displays selectable cancel and confirm buttons. Accordingly, at this point, the user may select the displayed visual representation (in any of the previously described ways) or cancel or confirm the requested action by using the cancel or confirm buttons, respectively.

Process 400 then proceeds to decision block 410, where it may be determined whether a displayed visual representation was selected by the user. This may be done in any suitable way, as aspects of the disclosure provided herein are not limited in this respect. When it is determined, in decision block 410, that a user clicked the displayed visual representation of the application program, process 400 proceeds, via the "YES" branch, to act 412, where the focus of the computing device executing process 400 is directed to the application program, and process 400 completes.

In act 412 of process 400, when the focus of the computing device is directed to the selected application program, the voice agent may provide the application program with information related to the interaction between the user and the voice agent. Any suitable information may be provided, as aspects of the disclosure provided herein are not limited in this respect. In some embodiments, the voice agent may provide the application program with information received by the voice agent from the user. For example, information provided by the voice agent to the application program may include information provided by the user at least partially specifying the action that the user wishes to be performed. For example, if the information was provided via voice input, the voice agent may provide recognized text corresponding thereto to the application program. The user may then interact with the application program directly to complete specifying the action by providing additional inputs, edit inputs previously provided via the voice agent, or in any other suitable way. As one non-limiting example, a user may provide input to a voice agent that specifies that the user wants to send an e-mail to Alistair Jones, but does not specify a subject of the e-mail or text to include in the body of the e-mail. The voice agent may present the user with a selectable visual representation of an e-mail application program. If the user selects the visual representation, the voice agent may provide information to the e-mail application program indicating that the user wishes to send an e-mail to Alistair Jones. The e-mail application program may then present the user with a user interface in which the "To" field is filled out with "Alistair Jones," and the user may then provide input for the rest of the e-mail directly via the e-mail application.

As previously described, after the focus of the computing device is directed to the selected application program, the application program may receive input from a user of the computing device and/or present the user with output. To this end, a user interface of the application program may be presented to the user. In some embodiments, after the focus of the computing device is directed to an application program identified as relating to received input (e.g., in act 412 of process 400), a user interface of the voice agent may be presented to the user concurrently with a user interface of the application program (as described in greater detail below with reference to FIG. 7), whereas in other embodiments the user interface of the application program is presented to the user without also presenting the user interface of the voice agent.

When it is determined in decision block 410 that a selection of a displayed visual representation was not detected (e.g., by determining that no such selection was provided within a threshold period of time), process 410 proceeds, via the "NO" branch, to decision block 414, where a determination is made as to whether the interaction between the voice agent and the user of the computing device is completed. Such a determination may be made in any suitable way, as aspects of the disclosure provided herein are not limited in this respect. As one non-limiting example, it may be determined that the interaction is completed if the user provides an indication to the computing device that the user no longer wishes to interact with the voice agent (e.g., by pressing a button, selecting "cancel" in FIG. 5B, etc.). As another non-limiting example, it may be determined that the interaction is completed if an action specified in input provided by the user was fully performed (e.g., an e-mail was sent, a calendar appointment was created, a text message was sent, etc.).

When it is determined in decision block 414 that the interaction between the voice agent and the user is not completed, process 400 returns, via the "NO" branch, to act 408 and the voice agent continues interacting with the user. Otherwise, process 400 completes.

As should be appreciated from the foregoing, input received by a voice agent may at least partially specify an action whose performance involves performance of multiple tasks. To perform an action at least in part by using another application program, a voice agent may obtain one or more inputs at least partially specifying the action, present the user with a visual confirmation of a proposed action to be performed, provide the obtained inputs to an application program that will perform the action (e.g., an e-mail application program), and/or perform any other suitable tasks in furtherance of the action. For example, to send an e-mail, a voice agent may obtain one or more inputs specifying the e-mail (e.g., a recipient of the e-mail, a subject line of the e-mail, text of the e-mail, etc.), present the user with a proposed e-mail constructed using the obtained inputs, provide the obtained inputs to an e-mail application program, cause the e-mail application program to send the constructed e-mail, and/or perform any other suitable tasks in furtherance of the action.

Accordingly, in some embodiments, when a received voice input at least partially specifies an action to be performed (e.g., partially identifying an e-mail to be sent) by performing one or multiple tasks, the voice agent may trigger performance of one or more tasks in furtherance of the action (e.g., open the e-mail application program and partially construct the e-mail), and display a visual representation of the action before the performance of the one or more of these tasks is completed (e.g., notify the user before the e-mail application program is opened and/or the e-mail partly constructed). To this end, in some embodiments the voice agent may identify an application program relating to the received input by identifying an application program that may be used to at least partially perform the action (e.g., by performing one or more tasks). This may be done in any suitable way, examples of which were described above with reference to act 404 of process 400. Next, a voice agent may trigger performance of one or more of the tasks and display a visual representation of an action (which, in some embodiments, may be a visual representation of the identified application program) before performance of one, some, or all tasks is completed. The visual representation of the action may be displayed in any suitable way, examples of which are described with reference to act 406 of process 400. In this way, a user may be quickly provided with a visual confirmation of the voice agents' understanding of the user's input. For example, the user may be provided with the visual confirmation before the performance of one or more tasks (in furtherance of an action requested by the user) is completed.

One illustrative non-limiting embodiment in which a voice agent triggers performance of one or more tasks in furtherance of an action and displays a visual representation of the action before one or more of the triggered tasks are completed is shown in FIGS. 5C and 5D, which illustrate a user interface of a computing device during an interaction between the voice agent executing on the device and a user.

FIG. 5C illustrates a graphical user interface 510 of a voice agent comprising a conversational flow area 512. In the illustrated example, the voice agent receives voice input "Set up a meeting with Alfred for tomorrow" from a user, processes the received voice input, and displays the corresponding textual transcription 514 in conversational flow area 512. Performing the action of creating a calendar appointment may comprise performing multiple tasks including, but not limited to, obtaining all inputs necessary for specifying the action (e.g., date and time of when to create the appointment), providing the obtained inputs to an application program that may at least partially perform the action (e.g., a calendar application program), and/or any other suitable task or tasks.

In the illustrated example, the voice agent may trigger performance of one or more tasks in furtherance of the action of creating a calendar appointment. For example, the voice agent may trigger the performance of the task of obtaining all inputs necessary for specifying the action because, in the present example, the user has provided the day, but not the time for the appointment. For example, the voice agent may prompt the user with the prompt "OK. What time?" A corresponding textual transcription 518 is shown in conversational flow area 512. The voice agent may further display a visual representation 516 of the requested action (an icon of the calendar application program) to the user before the user provides the voice agent input indicating a time for the appointment, and in some embodiments even before prompting the user with the prompt "OK. What time?" In some embodiments, the visual representation 516 may be selectable, thereby affording the user a choice for how to specify the time for the appointment. The user may provide the time to the voice agent by speaking in response to the prompt, or the user may select the displayed visual representation, which directs the focus of the computing device to the calendar application program, thereby allowing the user to provide the time directly to the calendar application program by interacting with the user interface of the calendar application program rather than the voice agent.

Figure 6B:
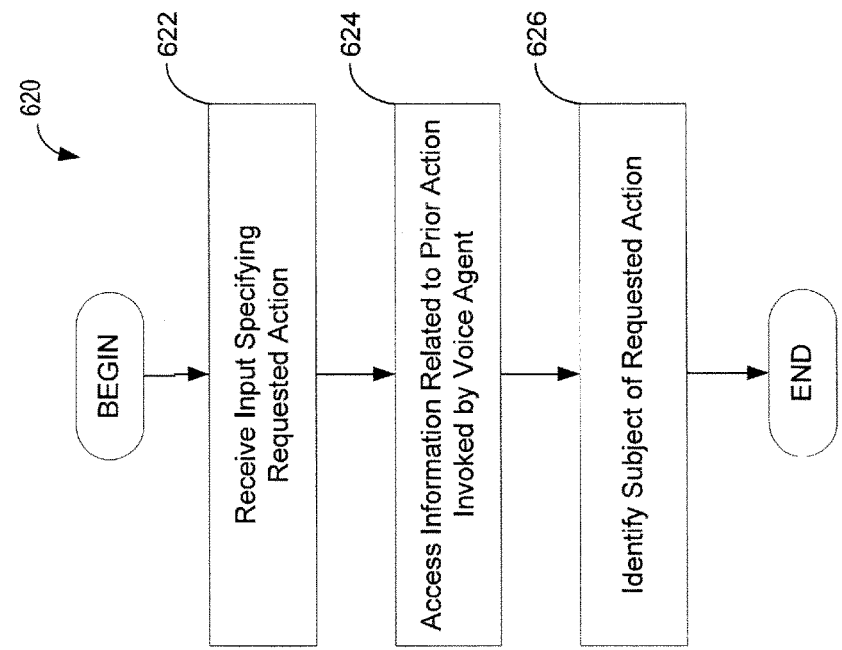
FIG. 6B is a flow chart of an illustrative process for interpreting a user's voice input at least in part by accessing information previously provided to the voice agent, in accordance with some embodiments.
Figure 6A:
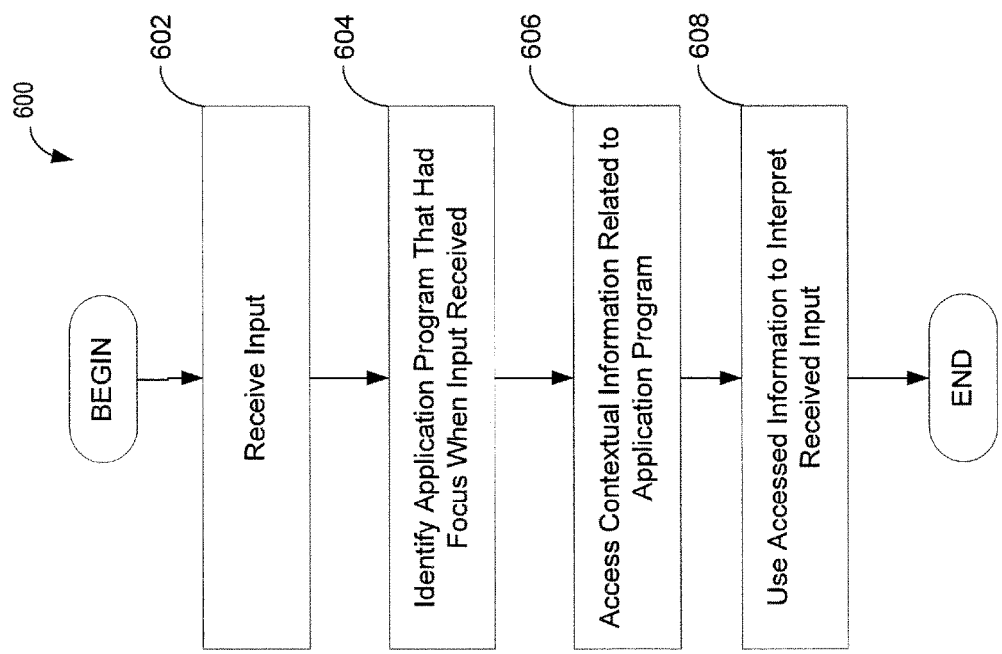
FIG. 6A is a flow chart of an illustrative process for interpreting a user's voice input at least in part by accessing contextual information of the application program having the focus of the computing device when the voice agent was invoked, in accordance with some embodiments.

As previously described, in some embodiments, a voice agent may access information about the context in which input is provided to the voice agent and may use such contextual information to interpret the user's input. Examples of such embodiments are described below with reference to FIG. 6A, which is a flow chart of illustrative process 600 for interpreting a user's voice input at least in part by accessing contextual information of the application having the focus of the computing device when the voice was invoked. Process 600 may be performed by any computing device programmed to implement at least one voice agent, an example of which is computing device 104 described with reference to FIG. 1.

Process 600 begins at act 602, where a voice agent receives input from a user. The input may be received as part of input received by the computing device executing process 600 to invoke the voice agent. Alternatively, the input may be received as part of input received by the computing device after the voice agent has already been invoked. The voice agent may interpret the at least in part by using contextual information as described in greater detail below.

In some embodiments, the voice agent may receive input from the user while the user is interacting with one or more other application programs. For example, the user may provide input (e.g., voice input) to the voice agent while interacting with a web-browser, a calendar application program, an e-mail application program, a social networking application program, or any other application program, as aspects of the disclosure provided herein are not limited in this respect. In some embodiments, the input may be received by the voice agent while the user is interacting with the operating system of the computing device executing process 600. In some embodiments, such as those described below with reference to FIG. 6B, the input may be received by the voice agent while the user is interacting with the voice agent. However, aspects of the disclosure provided herein are not limited in this respect, as the input need not be received while the user is interacting with the voice agent.

After the input is received, the process 600 proceeds to act 604, where the voice agent may identify the application program that had the focus of the computing device that is executing process 600 when the input was received. This may be done in any of numerous ways, as aspects of the disclosure provided herein are not limited in this respect. As one non-limiting example, the voice agent may identify the application program that had the focus of the computing device before the voice agent was invoked by querying the operating system executing on the computing device for this information (e.g., via a call to the operating system). Accordingly, in some embodiments, the operating system may provide the voice agent with information identifying the last application program that had the focus of the computing device.

Next, process 600 proceeds to act 606, where the voice agent may access contextual information related to the application program identified at act 604. The voice agent may access contextual information related to the identified application program in any suitable way, examples of which were previously described with reference to contextual information component 216 shown in FIG. 2.

In some embodiments, the contextual information may comprise any information related to one or more interactions between the user and the application program identified in act 604. For example, the contextual information may comprise information identifying one or more inputs received by the application program from the user. As another example, contextual information may comprise information identifying one or more actions that a user requested the application program to perform. The requested actions may be any suitable actions that the application program may be configured to perform. For example, when the application program is a calendar application program, the user may have requested that the calendar application program create an appointment or send an invitation to an appointment. As another example, when the application program is a map application program, the user may have requested that the map application program provide directions to a location, show a map of the user's current location, or show a map of a location of interest to the user. As yet another example, when the application program is an e-mail application program, the user may have requested that the e-mail application program send an e-mail.

Additionally or alternatively, contextual information may comprise information identifying one or more subjects of an action that the user requested the application program identified in act 604 to perform. In some examples, a subject of a requested action may be a person. For example, a user may request that an e-mail application program send an e-mail to one or more recipients, and each of the recipients is a subject of the requested action. As another example, a user may request to create a calendar appointment with a person, and that person is a subject of the requested action. As yet another example, a user may request to call a person, and that person is a subject of the requested action. In other examples, a subject of a requested action may be an item. For example, a user may request that an e-mail be forwarded to a recipient, and the particular e-mail is also a subject of the requested action. As another example, a user may request to zoom into a photograph, and the photograph is a subject of the requested action. As yet another example, a user may request that a song be played; the song is the subject of the requested action.

As should be appreciated from the foregoing, a requested action may have one subject or multiple subjects, as aspects of the disclosure provided herein are not limited in this respect. For example, a user may request that an e-mail be forwarded to a recipient. In this example, the e-mail and the recipient each are subjects of the action.

In some embodiments, contextual information may comprise information identifying one or more outputs presented to the user by the application program identified in act 604. For example, when the application program is a web-browser, contextual information may comprise information identifying one or more web pages shown to a user. As another example, when the application program is a program for managing photographs, contextual information may comprise information identifying one or more photographs shown to a user. As yet another example, when the application program is a program for managing media content (e.g., music and videos), contextual information may comprise information identifying one or more songs acoustically presented to the user. It should be recognized that these examples are merely illustrative and that contextual information can include information identifying other outputs of these or other application programs, as aspects of the techniques described herein relating to providing contextual information are not limited to the specific examples listed above.

In some embodiments, the voice agent may additionally access contextual information that may be unrelated to the application program identified in act 604, but which may be used by the voice agent to interpret the user input. For example, in some embodiments, the voice agent may access information about the user's contacts (e.g., a contact list) that may be stored locally on the computing device or remotely at a location accessible by the computing device. This may be done in any suitable way. For example, the voice agent may access such contact information directly or via an API call to an application program for managing the user's contacts.

After the voice agent obtains contextual information related (or unrelated) to the application program identified in act 604, process 600 proceeds to act 608, where the voice agent may use the accessed contextual information to interpret input received in act 602.

In some embodiments, the received input may specify an action and the voice agent may interpret the received input at least in part by using contextual information accessed in act 606 to identify one or more subjects of the action in any of numerous ways. For example, the subject of an action may be ambiguously specified in the received input and the contextual information may be used to resolve the ambiguity. For example, the received input may ambiguously identify one or more subjects of the action when the input contains one or more words (e.g., pronouns) that depend on the context in which they are used to unambiguously identify what they are referring to. Examples of such words include, but are not limited to, "him," "her," "it," "this," "that," "these," "those," "then," "there," "thence," "here," "hither," and "hence." For example, a voice agent may receive input from a user indicating the user wishes to "send an e-mail to him," "enlarge that photo," "schedule an appointment for then," "send an address of this web page," etc. In such cases, the voice agent may use contextual information to identify a subject of the requested action.

In one illustrative non-limiting example, a user may provide input to a voice agent, while viewing a web page via a web browser application program, indicating that the user wishes to "send this web page to Joe Smith." The voice agent may access contextual information associated with the web-browser application to identify the web page that the user is viewing as a subject of the action of sending e-mail. The voice agent may also access other contextual information to interpret the user's input. For example, the voice agent may access the user's contact information to obtain an e-mail address for Joe Smith. In another illustrative non-limiting example, a user may provide input to a voice agent while looking at a photograph via a photo management application program, indicating that the user wishes to "text this photograph to Andrea Dyson." The voice agent may access contextual information associated with the photo-management application program to identify the photograph that the user is viewing as a subject of the action of sending a text message. The voice agent may also access the user's contact information to obtain a phone number for Andrea Dyson. In another illustrative non-limiting example, a user may provide input to a voice agent while looking at a location on a map, indicating that the user wishes to "obtain directions to that location." The voice agent may access contextual information associated with the map application program to identify the location that the user is viewing as a subject of the requested action of obtaining directions. In yet another illustrative non-limiting example, a user may provide input to a voice agent, after creating an appointment with Joe Smith in a calendar application, indicating that the user wishes to "send a meeting reminder to him." The voice agent may access contextual information to determine that Joe Smith is the subject of the action (i.e., is to whom the meeting reminder is to be sent) and to identify an e-mail address and/or a phone number for Joe Smith.

In accordance with some embodiments, a voice agent is not limited to using contextual information to determine a subject of an action, and may use contextual information to interpret received input in any other suitable way. For example, the voice agent may use received input and contextual information to identify an action to be performed, or to interpret the received input in any other suitable way. After process 600 interprets received input in act 608 using contextual information, process 600 completes.

It should be appreciated that variations of process 600 are possible. For instance, in the illustrated embodiment, the voice agent accesses contextual information related to an application program that had the focus of the computing device when the voice agent received the voice input. However, in other embodiments, the voice agent may access contextual information related to any application program that does not have the focus when the input is received, but had the focus of the computing device (e.g., in order to interact with the user) within a specified period of time of the voice agent receiving input from the user (e.g., within the last ten minutes, within the last 30 minutes, within the last hour, within the last day, etc.). In some embodiments, the voice agent may be provided with such information by the operating system of the computing device (e.g., in response to the voice agent querying the operating system). For example, the voice agent may be configured to periodically query the operating system and, in response, be provided with information identifying the last application program that had the focus of the computing device. In this way, the voice agent can examine the history of such responses to determine which application programs had the focus of the computing device within a specified period of time of the voice agent receiving input from the user. In yet other embodiments, the voice agent may access contextual information related to any application program that does not have the focus of the computing device when the input is received, but that had been previously invoked and/or accessed (e.g., via an API of the application program and/or an API of the operating system) by the voice agent. The voice agent may maintain a list of application programs invoked and/or accessed by the voice agent and access contextual information associated with any application programs on the list to interpret received user input.

In some embodiments, a voice agent may interpret the user's voice input at least in part by accessing information previously provided to the voice agent by the user. An example of such an embodiment is described with reference to FIG. 6B, which is a flow chart of an illustrative process 620 performed by a voice agent for interpreting the user's input by using information previously provided to the voice agent to identify a subject of an action requested by the user. Process 620 may be performed by any computing device programmed to implement at least one voice agent, an example of which is the computing device 104 described with reference to FIG. 1.

Process 620 begins at act 622, where the voice agent receives input from a user. The received input may be voice input or any other suitable type of input, examples of which were previously described. The received input may be part of input used to invoke the voice agent. Alternatively, the input may be received after the voice agent has been invoked. In the process 620, the received input may be interpreted by the voice agent by using contextual information as described in greater detail below.

In the illustrated embodiment, the received input may specify one or more requested actions. The received input may specify any suitable type of action or actions, examples of which were previously described. In some instances, the received input may specify an action, but ambiguously specify (or fail to specify) a subject of the action by using one or more of words that depend on the context in which they are used to unambiguously identify the subject they are referring to (e.g., "this," "that," "him," etc.).

After the input is received, process 620 proceeds to act 624, where the voice agent may access information related to one or more interactions between the user and the voice agent. In some embodiments, such information may be maintained by the voice agent (e.g., as previously described with reference to contextual information store 218 in FIG. 2) and may identify one or more inputs provided to the voice agent by the user, one or more outputs presented to the user by the voice agent, one or more prior actions invoked by the voice agent, and/or any other suitable information. A prior action invoked by the voice agent may be any action which was specified and/or performed, at least in part, by using the voice agent.

As should be appreciated from the foregoing, in some embodiments the voice agent may access contextual information related to one or more prior actions invoked by the voice agent. Contextual information related to a prior action invoked by the voice agent may identify the prior action and, in some embodiments, may identify a subject or subjects of the prior action. As previously mentioned with reference to process 600, examples of subjects of an action include a person and an item.

The voice agent may access contextual information related to any suitable prior action invoked by the voice agent and may identify such contextual information based at least in part on input provided by the user. As one non-limiting example, the voice agent may access contextual information related to any prior action invoked by the voice agent based at least in part on input provided by the user within a period of time of receiving input at act 622 (e.g., within the last 30 seconds, the last minute, the last 10 minutes, the last 30 minutes, the last hour, the last day, the last week, the last month, etc.).

After the voice agent accesses contextual information about one or more prior actions invoked by the voice agent, process 600 proceeds to act 626, where the voice agent may use the accessed contextual information to interpret input received in act 622. For example, when the received input specifies an action to be performed, the voice agent may use the contextual information obtained at act 624 to identify one or more subjects of the specified action. This may be done, for example, when the subject of the action is not specified or is ambiguously specified (e.g., by using a pronoun).

In one illustrative non-limiting example, a user may provide input the voice agent with the input "send a text message to John Smith stating 'Do you want to meet for lunch today?'" At a later time, the user may provide the voice agent with the input "send him a text message stating 'Actually, I can't meet for lunch today. Let's have lunch tomorrow.'" The voice agent may use the contextual information associated with the prior action of sending the first text message to identify that John Smith is a subject of the requested action. In another illustrative non-limiting example, a user may provide the voice agent with the input "schedule a meeting with John Smith tomorrow at 10 am." At a later time, the user may provide the voice agent with the input "send a calendar invitation to that meeting to Sarah Jane." The voice agent may use the contextual information associated with the prior action of creating a meeting to identify that the created meeting is the subject of the requested action of sending the calendar invitation to Sarah Jane.

In some embodiments, the subject of the action may be ambiguously specified because there may be multiple subjects of the action consistent with the input and the voice agent may use the contextual information obtained in act 624 to disambiguate and identify the intended subject of the action. For example, the voice agent may receive the input "send an e-mail to John" and determine that the user has multiple contacts named John. In some embodiments, the voice agent may prompt the user to provide additional information to identify which John, among those in the user's contacts, the user intends to be the subject of the action. In other embodiments, the voice agent may use the contextual information obtained in act 624 to determine which John the user wishes to e-mail. This may be done in any suitable way. For example, in some embodiments, the voice agent may analyze the contextual information and determine that, among those prior actions in which any "John" was a subject of the prior action, "John Dreyer" was the subject of the prior action at least a threshold number of times, at least a certain percentage of times, for the last threshold number of prior actions, etc. Accordingly, the voice agent may determine that "John Dreyer" is the intended subject of the requested action of sending an e-mail to "John." As should be appreciated from this illustrative non-limiting example, the voice agent may use information from previous input to disambiguate and identify the subject of the action.

A voice agent may use contextual information related to a prior action performed at least in part by one application program to interpret input specifying an action to be performed by the same application program or another application program, as aspects of the disclosure provided herein are not limited in this respect. For example, a user may provide input to a voice agent requesting to "send a text message to John Smith stating 'Do you want to meet for lunch today?'" The action of texting may be performed at least in part by using a text messaging application program. At a later time, the user may provide input to the voice agent requesting to "e-mail that message to John Smith as well." The voice agent may use contextual information associated with the prior action (of texting) to identify that the previously texted message is a subject of the later action, which may be performed by an e-mail application program.

It should be recognized that a voice agent is not limited to using contextual information related to a prior action invoked by the voice agent to identify a subject of a requested action, and may use such contextual information in other ways. For example, the voice agent may use such contextual information and the received input to identify an action to be performed or to interpret the received input in any other suitable way, as aspects of the disclosure provided herein are not limited in this respect.

After process 600 interprets received input in act 626 using contextual information accessed in act 624, process 620 completes.

Figure 7:
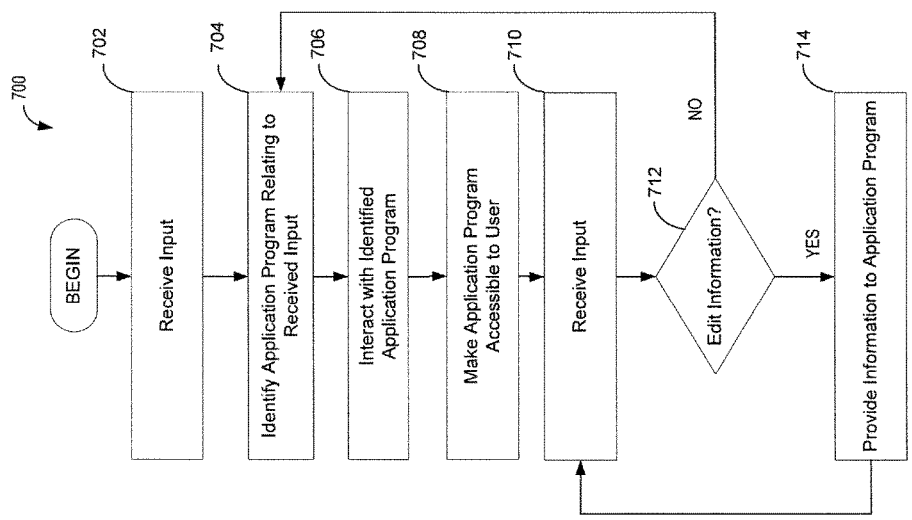
FIG. 7 is a flow chart of another illustrative process, performed by a voice agent, for providing another application program with information specified by a user's voice input to the voice agent, in accordance with some embodiments.

As previously mentioned, in some embodiments, a user may provide input specifying an action to be performed via a user interface of the voice agent, a user interface of the application program, or any suitable combination thereof. FIG. 7 shows a flow chart of illustrative process 700 for interacting with a user by using a voice agent. Process 700 may be performed by any computing device programmed to implement at least one voice agent, an example of which is computing device 104 described with reference to FIG. 1.

Process 700 begins at act 702, where a voice agent receives input from a user. The received input may be voice input or any suitable type of input, examples of which were previously described. The received input may be part of input used to invoke the voice agent. Alternatively, the input may be received after the voice agent has been invoked.

In some embodiments, the received input may specify completely a requested action to be performed. However, in other instances, the received input may incompletely specify the requested action. For example, a requested action may need one or multiple inputs to be specified in order to be performed (e.g., an action of sending e-mail may need inputs such as a recipient of the e-mail, subject of the e-mail, text of the body of the e-mail). Received input may completely specify the requested action by providing each of the one or multiple inputs needed to specify the action. However, in some instances, received input may only partially or incompletely specify the requested action by providing only some of the one or more multiple inputs needed to specify the action (e.g., a voice agent may receive input "send an e-mail to Alistair Jones" that does not specify either a subject for the e-mail or text to put into the body of the e-mail).

After input is received at act 702, process 700 proceeds to act 704, where the voice agent may identify an application program or programs as relating to the received input. This may be done in any suitable way, examples of which were previously described with reference to act 404 of process 400. As one non-limiting example, an application program may be identified as relating to received input when the received input at least partially specifies a requested action and the application program may be used to at least partially perform the requested action.

Next, process 700 proceeds to act 705, where the voice agent may interact with the identified application program based at least in part on the input received at act 702. In some embodiments, the voice agent may provide information to the identified application program. As one non-limiting example, the voice agent may provide the application program with information identifying a requested action at least partially specified by the received input. For instance, if the user provides input "send an e-mail to Alistair Jones," the voice agent may provide an e-mail application program with information identifying that the requested action is to send an e-mail. As another non-limiting example, the voice agent may provide the application program with information identifying one or more inputs used to partially or completely specify the action. For example, the voice agent may provide the e-mail application program with information identifying a subject of the requested action (e.g., Alistair Jones). The information identifying the recipient of the e-mail may take any suitable form. In one embodiment, the voice agent may access contact information accessible (stored locally or otherwise) to the computing device executing process 700, locate the e-mail address for the recipient, and provide it to the e-mail application program so that when the e-mail application program is launched the recipient's address is already populated.

In some embodiments, the voice agent may interact with the application program by causing the application program to perform one or more functions. When the received input at least partially specifies an action, the voice agent may cause the application program to begin a process of formulating the action, whereby the application program may perform one or more tasks in furtherance of the action. For example, the application program may perform one or more of the following tasks: process information identifying the action to be performed, process information identifying one or more inputs at least partially specifying the action to be performed, identify one or more additional inputs that need to be specified for the action to be performed, request that the voice agent obtain the additional input(s), and/or construct one or more data structures used by the application program to perform the identified action. As another example, the application program may display a user interface containing visual feedback responsive to the received input to the user. The application program may display a user interface to the user in any suitable way including the ways described in greater detail below. Such a user interface may provide a visual confirmation of the requested action and of one or more inputs specifying the requested action. For instance, if the user provides input: "send an e-mail to Alistair Jones," the application program may display a user interface showing an e-mail form with the "To" field filled with Alistair Jones's e-mail address. As another example, if the user provides input: "create a new appointment with Alistair Jones tomorrow at 10 am," the application program may display a user interface showing a view of the user's calendar with a proposed appointment shown on the calendar next to other items already in the calendar.

A voice agent may interact with the identified application program in any of the above-described ways, or in any other suitable way, even if the voice agent has not obtained all inputs required to completely specify an action to be performed by the application program. For instance, in some embodiments, a voice agent may receive one or more inputs that incompletely specify a requested action, and the voice agent may provide these input(s) to the application program and continue to interact with the user to obtain one or more additional inputs to completely specify the requested action. For example, the voice agent may receive the input "send an e-mail to Alistair Jones" and, in addition to providing information to an e-mail application program indicating that the user requests to send an e-mail to Alistair Jones, the voice agent may continue interacting with the user to obtain additional inputs to fully specify the action of sending the e-mail. As an illustrative non-limiting example, the voice agent may prompt the user to specify a subject line for the e-mail and content for the body of the e-mail, or may interact with the user in any other suitable way to obtain additional inputs, as aspects of the disclosure provided herein are not limited in this respect.

After interacting with the application program identified as relating to the received input, process 700 proceeds to act 708, where the voice agent may make the application program accessible to the user. This may be done in any of numerous ways. For example, as previously described, in some embodiments the voice agent may display a selectable visual representation (e.g., an icon) of the application program. The user may select the displayed visual representation to direct the focus of the computing device to the application program and cause the application program's user interface to be presented to the user. However, there are other ways in which the voice agent may make an application program accessible to a user, as aspects of the disclosure provided herein are not limited to providing a selectable visual representation to the user.

In some embodiments, the voice agent may make the identified application program accessible to the user by causing the user interface of the application program to be displayed to the user concurrently with the user interface of the voice agent. This may be done in any suitable way. In some embodiments, the voice agent may alter a portion of its user interface to be partially or fully transparent. This portion may overlie the user interface of the identified application program such that the user interface of the application program is visible to the user. In this way, even though the voice agent has the focus of the computing device with the voice agent's user interface being displayed in the foreground, the at least partial transparency of the voice agent's user interface allows the user to see the user interface of the identified application program, which is presented in the background. On the other hand, since only a portion of the voice agent's user interface is at least partially transparent, the user can see other portions of the voice agent's user interface that are not transparent (e.g., a conversational flow area in which textual transcriptions of the user's input and/or the voice agents output are shown). For example, the concurrent display of the calendar program's user interface 312 and the voice agent's user interface 314, as shown in FIG. 3B, may be realized by making the upper portion of the voice agent's user interface at least partially transparent. However, it should be recognized that the transparent portion of the voice agent user interface may be positions so that application program portion may be displayed above, below, to the left of, to the right of, or at least partially overlapping with the voice agent portion, or in any other suitable way, as aspects of the disclosure provided herein are not limited in this respect.

In other embodiments, the operating system of the computing device executing process 700 may be configured to concurrently display the user interface of the voice agent and the user interface of another application. The operating system may be programmed to implement such functionality in any suitable way. For example, in some embodiments the operating system may be programmed to implement a graphical user interface component comprising two GUI widgets (e.g., windows), whereby the user interface of the voice agent may be shown in one widget while the user interface of the application program may be shown concurrently in the other. The widgets may be displayed in any suitable manner relative to one another. For example, the widget in which the user interface of the application program is shown may be displayed above, below, to the left of, to the right of, or at least partially overlapping with the widget in which the user interface of the voice agent may be shown.

In embodiments wherein the operating system supports displaying multiple application programs simultaneously, the voice agent may make the application program accessible to the user by making a system call to the operating system, as part of act 706, to indicate to the operating system that the voice agent's user interface is to be presented concurrently with the user interface of the application program that was identified as relating to the input received in act 702. In response, the operating system may display the voice agent's user interface and the user interface of the identified application program in separate GUI widgets.

Regardless of the way in which the user interfaces of the voice agent and the application program identified at act 704 are concurrently displayed, these interfaces may be used to concurrently present visual feedback in response to input received in act 702. Any of numerous types of visual feedback in response to the received input may be presented by each of the interfaces. As one non-limiting example, one or both of the user interfaces may present visual feedback indicative of the requested action. As another non-limiting example, one or both of the user interfaces may present visual feedback indicative of one or more inputs specifying the requested action. The user interfaces may present different types of visual feedback, as aspects of the disclosure provided herein are not limited to having the visual feedback from the application portion and from the voice agent portion be identical. For example, the voice agent portion of the user interface may be used to present a textual transcription of the received input, a textual transcription of the voice agent's response to the received input, and/or any other suitable information. The application portion of the user interface may provide a visual confirmation of the requested action using a graphical user interface of the application program.

Figures 8A, 8B:
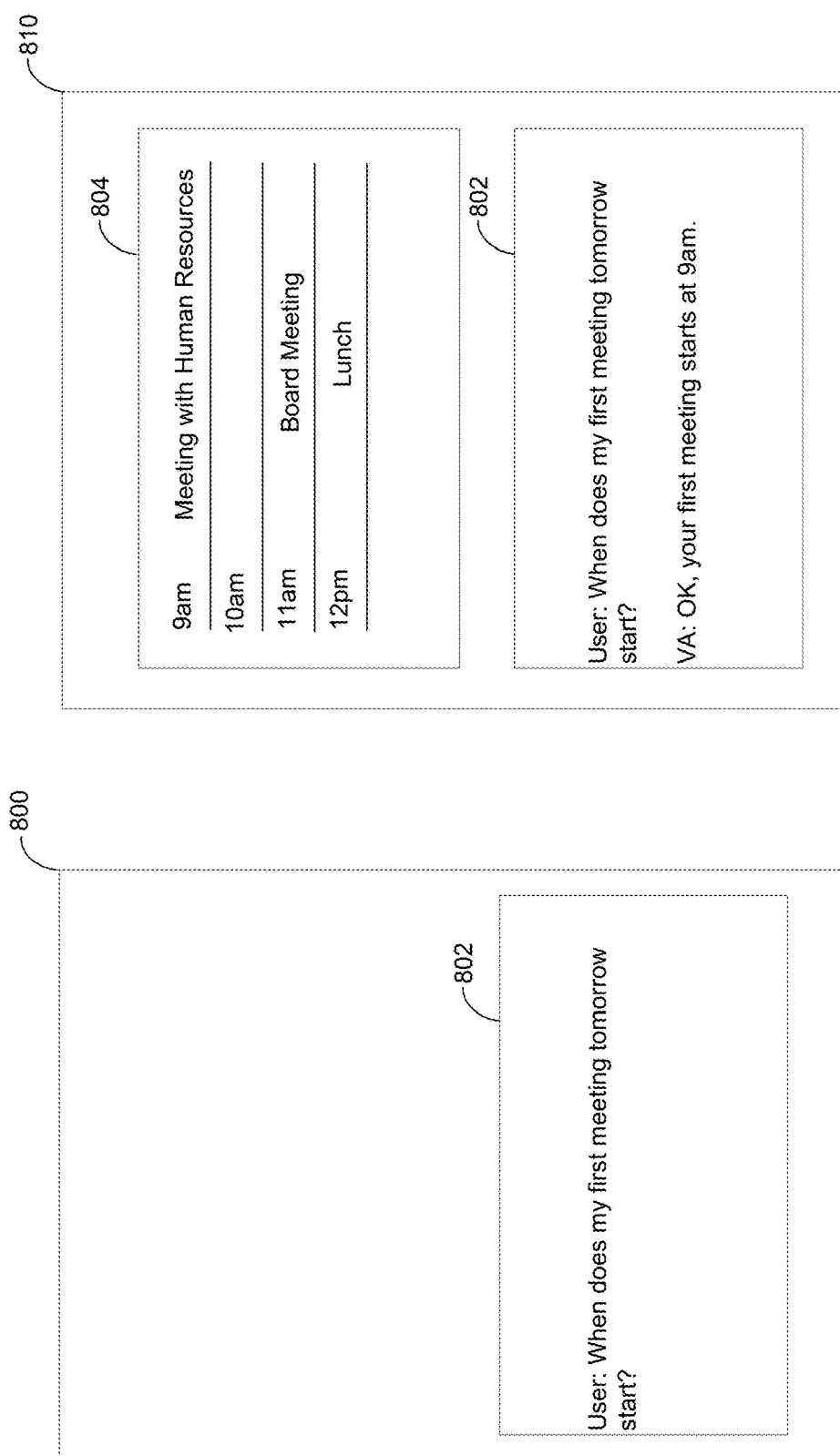
FIG. 8A illustrates another graphical user interface of a voice agent that presents a transcription of voice input provided to the voice agent, in accordance with some embodiments.
FIG. 8B illustrates a graphical user interface of a computing device, in which a graphical user interface of an application program is shown concurrently with a graphical user interface of the voice agent and each provides a user with a visual confirmation of the user's voice input, in accordance with some embodiments.

FIGS. 8A and 8B provide a non-limiting illustration of presenting visual feedback in response to received input concurrently via an application program portion and a voice agent portion of the user interface. FIG. 8A illustrates graphical user interface 800 of a computing device executing a voice agent. Interface 800 includes user interface 802 of the voice agent showing a textual transcription corresponding to the user input "When does my first meeting tomorrow start?" FIG. 8B illustrates graphical user interface 810 of the computing device, which presents visual feedback responsive to the received input using user interface 804 of the calendar application program and the user interface of the voice agent 802. The user interface of the calendar application program displays the user's calendar entries for "tomorrow," which include the user's first meeting. The user interface of the voice agent shows a textual transcription of the voice agent's response ("OK, your first meeting starts at 9 am) to the user input.

In some embodiments, the voice agent may make the identified application program accessible to the user in a way that enables the user to interact with the application program to provide and/or edit information at least partially specifying a requested action. Information at least partially specifying the requested action may comprise one or more inputs needed to completely specify the requested action or may be any other suitable information. In some embodiments, the voice agent may make the identified application program accessible to the user before performance of a requested action is completed so that the user may provide and/or edit information at least partially specifying the requested action. As one non-limiting example, a user may provide input "send an e-mail to Alistair Jones," and the voice agent may make the e-mail application program accessible to the user so that the user may interact with the e-mail application program to specify the subject of the e-mail and text of the body of the e-mail.

In some of the embodiments in which the voice agent makes the identified application program accessible to the user by displaying a selectable visual representation (e.g., an icon) of the application program, the user may select the displayed visual representation to direct the focus of the computing device to the application program and cause a user interface of the application program to be presented to the user. The user may then interact with the application program via its user interface to provide and/or edit information at least partially specifying the requested action. The system may make the application program selectable and direct the focus to it in any suitable way, examples of which will now be described.

In some of the embodiments in which the voice agent makes the identified application program accessible to the user by altering a portion of the voice agent's user interface to be partially or fully transparent, the user may select the transparent portion of the voice agent's user interface (e.g., by tapping or clicking on the transparent portion of the voice agent's user interface) to direct the focus of the computing device to the application program. The voice agent may detect that the user selected the transparent portion of its interface and may direct the focus of the computing device to the application program (e.g., via a call to the operating system or via a call to the API of the identified application program). The focus may then move to the application program so that the user interface of the application program is presented to the user in the foreground, with the user interface of the voice agent no longer being displayed to the user. The user may then interact with the application program via its user interface to provide and/or edit information at least partially specifying the requested action, or in any other way the user desires.

In some embodiments, when the voice agent detects that the user selected the transparent portion of its interface, the voice agent may identify the location of the selection (e.g., where the user tapped or clicked) in the transparent portion and provide this location to the application program (e.g., via a call to the operating system or via a call to the API of the application program). The application program may then respond as if the user directly selected the relevant location of the application program. For example, if the user selects the calendar application program's user interface by tapping on the transparent portion of the voice agent's interface at a location where a specific appointment is shown to the user by the calendar application program, the voice agent may provide the location of the tap to the calendar application program, which in turn may present details of the selected appointment to the user when it receives the focus of the computing device. In this way, the user's selection of the calendar application program not only shifts the focus of the computing device to the calendar application program, but the calendar application program responds to the selection (e.g., by selecting the appointment) so that the user need not make the selection again directly via the calendar application program.

In some embodiments in which the voice agent makes the identified application program accessible to the user by causing the operating system to concurrently display the voice agent's and application program's user interfaces, the user may select the GUI widget showing the application program's user interface (e.g., by tapping the widget, clicking on the widget, etc.) to direct the focus of the computing device to the application program. The operating system may then direct the focus of the computing device to the application program so that the user may interact with the application program to provide and/or edit information at least partially specifying the requested action, or in any other way the user desires. In some embodiments, the voice agent's user interface may still be presented to the user (via the other widget), even if the focus of the computing device is not directed to the voice agent, whereas in other embodiments only the selected application program may be displayed.

Regardless of the way in which the voice agent makes the application program accessible to the user in act 708, the user may continue to interact with the voice agent to provide and/or edit information specifying the requested action. Alternatively, in response to the voice agent making the application program accessible to the user, the user may interact with the application program's user interface directly to provide and/or edit information specifying the requested action. As one non-limiting example, a user may provide input "send an e-mail to Alistair Jones," and may subsequently interact with the e-mail application program and/or the voice agent to specify the subject of the e-mail and text of the body of the e-mail.

After the voice agent makes the identified application program accessible to the user, process 700 proceeds to act 708, where the voice agent may receive further input from the user. The received input may be voice input or any suitable type of input, examples of which were previously described. The received input may be part of input used to invoke the voice agent for another session. For example, after the voice agent made the application program accessible to the user and the user chose to interact directly with the application program, the user may provide input to invoke and interact with the voice agent for another session, thereby causing the focus of the computing device to be directed back to the voice agent and away from the application program with which the user was interacting directly. Alternatively, after the voice agent made the application program accessible to the user in act 708, the user may choose not to interact directly with the application program and may continue interacting directly with the voice agent by providing input to the voice agent.

After the voice agent receives input at act 710, process 700 proceeds to decision block 712, where it is determined whether the received input contains additional information or edits to any information specifying the requested action. This determination may be made in any suitable way, as aspects of the disclosure provided herein are not limited in this respect. For example, such a determination may be made by using natural language understanding techniques (e.g., such as the techniques described with reference to NLU component 212 in FIG. 2) to determine whether the received input relates to the action requested in the input received in act 702.

When it is determined that the received input does not contain additional information and/or edits to information specifying the requested action, process 700 returns to act 704, where an application program related to the received input may be identified.

On the other hand, when it is determined that the received input contains additional information and/or edits to information specifying the requested action, process 700 proceeds to act 714, where new information or the edits are provided to the application program (e.g., via the API of the application program). For example, the voice agent may receive the input "send an e-mail to Alistair Jones," in act 702, and the input "the subject is dinner reservations" in act 710. The voice agent may provide the information in the first of these inputs to an e-mail application program before receiving the second input, and provide the information in the second of these inputs to the e-mail application program in act 714 after receiving the second input. Alternatively, in some embodiments, the voice agent may provide information in both of these inputs to the e-mail application program after both inputs are received, as aspects of the present disclosure are not limited in this respect.

After providing additional information to the application program in act 714, process 700 returns to act 710, where the voice agent may receive additional user input. The additional user input may be input used to provide further information and/or edits to information specifying the requested task, but may also be any other suitable input.

Figure 9:
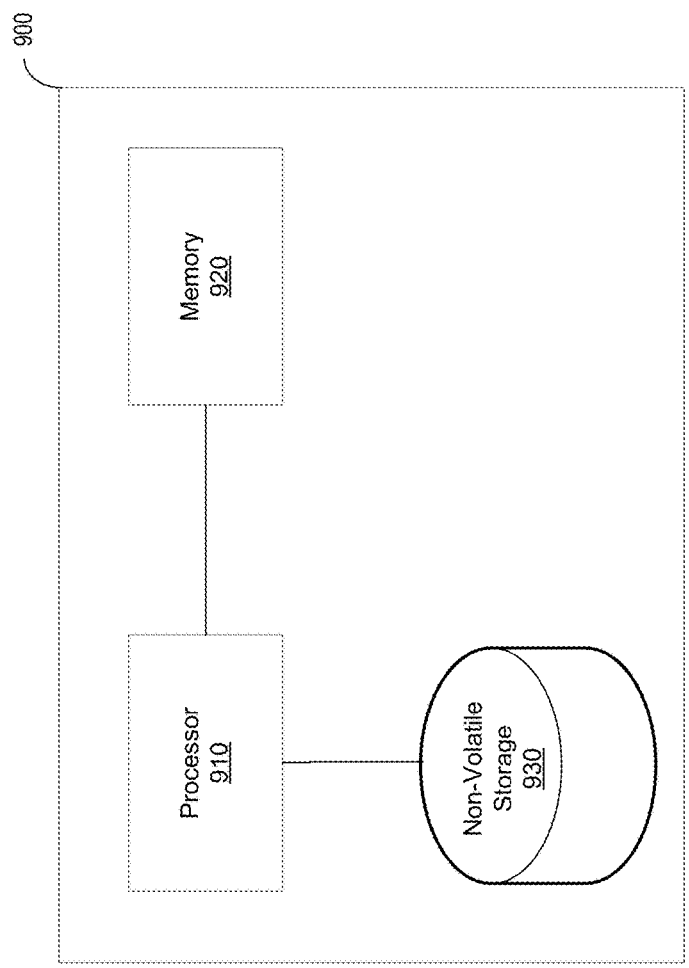
FIG. 9 is a block diagram of an illustrative computer system that may be used in implementing some embodiments.

An illustrative implementation of a computer system 900 that may be used in connection with any of the embodiments of the disclosure provided herein is shown in FIG. 9. The computer system 900 may include one or more processors 910 and one or more articles of manufacture that comprise non-transitory computer-readable storage media (e.g., memory 920 and one or more non-volatile storage media 930). The processor 910 may control writing data to and reading data from the memory 920 and the non-volatile storage device 930 in any suitable manner, as the aspects of the disclosure provided herein are not limited in this respect. To perform any of the functionality described herein, the processor 910 may execute one or more processor-executable instructions stored in one or more non-transitory computer-readable storage media (e.g., the memory 920), which may serve as non-transitory computer-readable storage media storing processor-executable instructions for execution by the processor 910.

In accordance with some embodiments, a voice agent may receive user input while another application has the focus the computing device on which the voice agent is implemented. As used herein, an application program is said to have the focus of the computing device (or the focus of the computing device is said to be directed to the application program) when the application program may receive input from a user of the computing device and/or present the user with output. The input received from the user may be of any suitable type and the output presented to the user may be of any suitable type. For example, an application program has the focus of the computing device when a user interface of the application program is displayed by the computing device.

It should be recognized that an application program may have the focus of the computing device, even when it is not presenting output to the user (e.g., by operating in the background), if the application program is configured to receive input from the user. As one non-limiting example, some embodiments described herein relate to a voice agent that is ubiquitous in the sense that it is essentially always available whenever the computing device is operating, regardless of what applications are running on the computing device. In some embodiments, the agent may provide output (e.g., visual output) to the user to remind the user that the voice agent is available, but in other embodiments the agent may provide no output to the user even when it is available to receive input.

It should be recognized an application program need not provide the user with any output to have the focus of the computing device. For instance, an application program (e.g., a ubiquitous voice agent or another application program) has the focus of the computing device, with or without presenting any output to the user (e.g., by operating in the background), when the application program is configured to receive input (e.g., voice input or any other type of input) from a user. As one non-limiting example, a ubiquitous voice agent may be configured to receive voice input from a user (e.g., to invoke the voice agent) without presenting any output to the user.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (FIGS. 4, 6A, 6B, and 7) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A computing device, comprising:
    at least one storage device configured to store a plurality of application programs, the plurality of application programs comprising a first application program that provides access to a web-based service; and
    at least one processor programmed to implement at least one voice agent, wherein the at least one voice agent is configured to:
        receive voice input that specifies at least one action to be performed without explicitly identifying an application program to perform the at least one action;
        process the voice input using an automatic speech recognition (ASR) engine to generate recognized speech comprising text;
        process, using a natural language understanding (NLU) engine, the text of the recognized speech to:
            determine a meaning of the text of the recognized speech;
            determine based, at least in part, on the determined meaning of the text of the recognized speech, the at least one action specified in the voice input; and
            identify based, at least in part, on the determined meaning of the text of the recognized speech, which of the plurality of application programs are configured to at least partially perform the at least one action specified in the voice input; and
        display a plurality of selectable visual representations corresponding to the plurality of application programs identified by the NLU engine, the plurality of selectable visual representations including a first selectable visual representation corresponding to the first application program, wherein the first selectable visual representation, when selected, causes focus of the computing device to be directed to the first application program.

2. The computing device of claim 1, wherein the first application program is a web browser application program.

3. The computing device of claim 1, wherein the voice input specifies the web-based service.

4. The computing device of claim 1, wherein the web-based service is accessible by a plurality of users each having an account with the web-based service, wherein the plurality of users includes a first user of the computing device, wherein the first user has a first account with the web-based service, and wherein the first application program provides access to the web-based service, at least in part, by using information associated with the first user's first account.

5. The computing device of claim 1, wherein the first application program is dedicated to providing access to the web-based service.

6. The computing device of claim 1, wherein the first selectable visual representation comprises a selectable icon associated with the first application program, wherein the selectable icon is configured to be selected in response to being tapped and/or clicked by a user.

7. A method performed by at least one voice agent, the method comprising:
receiving voice input that specifies at least one action to be performed without explicitly identifying an application program to perform the at least one action;
processing the voice input using an automatic speech recognition (ASR) engine to generate recognized speech comprising text;
processing, using a natural language understanding (NLU) engine, the text of the recognized speech to:
determine a meaning of the text of the recognized speech;
determine based, at least in part, on the determined meaning of the text of the recognized speech, the at least one action specified in the voice input; and
identify based, at least in part, on the determined meaning of the text of the recognized speech, which of a plurality of application programs are configured to at least partially perform the at least one action specified in the voice input; and
displaying a plurality of selectable visual representations corresponding to the plurality of application programs identified by the NLU engine, the plurality of selectable visual representations including a first selectable visual representation corresponding to the first application program, wherein the first selectable visual representation, when selected, causes focus of the computing device to be directed to the first application program.

8. The method of claim 7, wherein the first application program is a web browser application program.

9. The method of claim 7, wherein the voice input specifies a web-based service.

10. The method of claim 9, wherein the web-based service is accessible by a plurality of users each having an account with the web-based service, wherein the plurality of users includes a first user of the computing device, wherein the first user has a first account with the web-based service, and wherein the first application program provides access to the service, at least in part, by using information associated with the first user's first account.

11. The method of claim 7, wherein the first application program is dedicated to providing access to a web-based service.

12. The method of claim 7, wherein the first selectable visual representation comprises a selectable icon associated with the first application program, wherein the selectable icon is configured to be selected in response to being tapped and/or clicked by a user.

13. At least one non-transitory computer-readable storage medium storing processor executable instructions that, when executed by at least one computing device, cause the at least one computing device to implement at least one voice agent that performs a method comprising:
receiving voice input that specifies at least one action to be performed without explicitly identifying an application program to perform the at least one action;
processing the voice input using an automatic speech recognition (ASR) engine to generate recognized speech comprising text;
processing, using a natural language understanding (NLU) engine, the text of the recognized speech to:
determine a meaning of the text of the recognized speech;
determine based, at least in part, on the determined meaning of the text of the recognized speech, the at least one action specified in the voice input; and
identify based, at least in part, on the determined meaning of the text of the recognized speech, which of a plurality of application programs are configured to at least partially perform the at least one action specified in the voice input; and
displaying a plurality of selectable visual representations corresponding to the plurality of application programs identified by the NLU engine, the plurality of selectable visual representations including a first selectable visual representation corresponding to the first application program, wherein the first selectable visual representation, when selected, causes focus of the computing device to be directed to the first application program.

14. The at least one non-transitory computer-readable storage medium of claim 13, wherein the first application program is a web-browser application program.

15. The at least one non-transitory computer-readable storage medium of claim 13, wherein the voice input specifies a web-based service.

16. The at least one non-transitory computer-readable storage medium of claim 15, wherein the web-based service is accessible by a plurality of users each having an account with the web-based service, wherein the plurality of users includes a first user of the computing device, wherein the first user has a first account with the web-based service, and wherein the first application program provides access to the service, at least in part, by using information associated with the first user's first account.

17. The at least one non-transitory computer-readable storage medium of claim 13, wherein the first application program is dedicated to providing access to a web-based service.

18. The at least one non-transitory computer-readable storage medium of claim 13, wherein the first selectable visual representation comprises a selectable icon associated with the first application program, wherein the selectable icon is configured to be selected in response to being tapped and/or clicked by a user.

19. A computing device, comprising:
at least one processor programmed to implement at least one voice agent, wherein the at least one voice agent is configured to:
receive voice input that specifies at least one action to be performed without explicitly identifying an application program to perform the at least one action;
process the voice input using an automatic speech recognition (ASR) engine to generate recognized speech comprising text;
process, using a natural language understanding (NLU) engine, the text of the recognized speech to:
determine a meaning of the text of the recognized speech;
determine based, at least in part, on the determined meaning of the text of the recognized speech, the at least one action specified in the voice input; and
identify based, at least in part, on the determined meaning of the text of the recognized speech, which of at least one application program is configured to at least partially perform the at least one action specified in the voice input; and
display at least one selectable visual representation that, when selected, causes focus of the computing device to be directed to the selected application program of the at least one application program identified by the NLU engine as relating to the received voice input.

20. The computing device of claim 19, wherein the at least one application program comprises a first application that provides access to a web-based service for streaming video content and/or streaming audio content.

21. The computing device of claim 19, wherein the at least one application program comprises a plurality of application programs, and wherein the at least one voice agent is configured to display a plurality of selectable visual representations, each one of the plurality of selectable visual representations corresponding to one of the plurality of application programs.

22. A method performed by at least one voice agent, the method comprising:
   receiving voice input that specifies at least one action to be performed without explicitly identifying an application program to perform the at least one action;
   processing the voice input using an automatic speech recognition (ASR) engine to generate recognized speech comprising text;
   processing, using a natural language understanding (NLU) engine, the text of the recognized speech to:
      determine a meaning of the text of the recognized speech;
      determine based, at least in part, on the determined meaning of the text of the recognized speech, the at least one action specified in the voice input; and
      identify based, at least in part, on the determined meaning of the text of the recognized speech, which of a plurality of application programs is configured to at least partially perform the at least one action specified in the voice input; and
   displaying at least one selectable visual representation that, when selected, causes focus of a computing device programmed to implement the at least one voice agent to be directed to the at least one application program identified by the NLU engine as relating to the received voice input.

23. The method of claim 22, wherein the at least one application program comprises a first application that provides access to a web-based service for streaming video content and/or streaming audio content.

24. The method of claim 22, wherein the at least one application program comprises a plurality of application programs, and wherein the at least one voice agent is configured to display a plurality of selectable visual representations, each one of the plurality of selectable visual representations corresponding to one of the plurality of application programs.

25. At least one non-transitory computer-readable storage medium storing instructions that, when executed by at least one computing device, cause the at least one computing device to implement at least one voice agent that performs a method comprising:
   receiving voice input that specifies at least one action to be performed without explicitly identifying an application program to perform the at least one action;
   processing the voice input using an automatic speech recognition (ASR) engine to generate recognized speech comprising text;
   processing, using a natural language understanding (NLU) engine, the text of the recognized speech to:
      determine a meaning of the text of the recognized speech;
      determine based, at least in part, on the determined meaning of the text of the recognized speech, the at least one action specified in the voice input; and
      identify based, at least in part, on the determined meaning of the text of the recognized speech, which of a plurality of application programs is configured to at least partially perform the at least one action specified in the voice input; and
   displaying at least one selectable visual representation that, when selected, causes focus of a computing device programmed to implement the at least one voice agent to be directed to one of the plurality of application programs identified by the NLU engine as relating to the received voice input.

26. The at least one non-transitory computer-readable storage medium of claim 25, wherein the plurality of application programs comprises a first application that provides access to a web-based service for streaming video content and/or streaming audio content.

27. The at least one non-transitory computer-readable storage medium of claim 25, wherein the at least one voice agent is configured to display a plurality of selectable visual representations, each one of the plurality of selectable visual representations corresponding to one of the plurality of application programs.

* * * * *